United States Patent
Beshai et al.

(10) Patent No.: US 7,394,806 B2
(45) Date of Patent: Jul. 1, 2008

(54) DISTRIBUTED SPACE-TIME-SPACE SWITCH

(75) Inventors: Maged E. Beshai, Stittsville (CA); Dominic John Goodwill, Kanata (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1134 days.

(21) Appl. No.: 10/390,730

(22) Filed: Mar. 19, 2003

(65) Prior Publication Data
US 2003/0193937 A1    Oct. 16, 2003

(51) Int. Cl.
*H04L 12/50* (2006.01)
(52) U.S. Cl. .............. 370/380; 370/382
(58) Field of Classification Search .......... None
See application file for complete search history.

(56) References Cited

U.S. PATENT DOCUMENTS

| | | | |
|---|---|---|---|
| 5,144,619 A | 9/1992 | Munter | |
| 5,168,492 A | 12/1992 | Beshai et al. | |
| 5,430,722 A | 7/1995 | Jacob et al. | |
| 5,475,679 A | 12/1995 | Munter | |
| 5,623,356 A * | 4/1997 | Kaminow et al. | 398/46 |
| 5,663,818 A * | 9/1997 | Yamamoto et al. | 398/58 |
| 5,745,486 A | 4/1998 | Beshai et al. | |
| 5,889,600 A * | 3/1999 | McGuire | 398/50 |
| 6,118,792 A | 9/2000 | Beshai | |
| 6,288,808 B1 * | 9/2001 | Lee et al. | 398/49 |
| 6,333,799 B1 * | 12/2001 | Bala et al. | 398/9 |
| 6,486,983 B1 | 11/2002 | Beshai et al. | |
| 6,552,833 B2 * | 4/2003 | Liu et al. | 398/82 |
| 6,570,872 B1 | 5/2003 | Beshai et al. | |
| 6,738,581 B2 * | 5/2004 | Handelman | 398/79 |
| 6,813,407 B2 * | 11/2004 | Ramaswami et al. | 385/16 |
| 6,925,257 B2 * | 8/2005 | Yoo | 398/47 |
| 7,116,862 B1 * | 10/2006 | Islam et al. | 385/24 |
| 7,171,072 B2 * | 1/2007 | Beshai et al. | 385/24 |
| 7,212,739 B2 * | 5/2007 | Graves et al. | 398/5 |
| 2002/0015551 A1 | 2/2002 | Tsuyama et al. | 385/17 |
| 2002/0021467 A1 | 2/2002 | Ofek et al. | 359/128 |
| 2003/0030866 A1 | 2/2003 | Yoo | |

FOREIGN PATENT DOCUMENTS

| | | |
|---|---|---|
| CA | 2353744 A1 | 2/2002 |
| EP | 0964487 A1 | 12/1999 |

OTHER PUBLICATIONS

U.S. Appl. No. 10/222,223, filed Aug. 20, 2002, Maged Beshai et al.
U.S. Appl. No. 09/671,140, filed Sep. 28, 2000, Beshai et al.
European Search Report for 03252289.8, mailed Jun. 6, 2005.

* cited by examiner

*Primary Examiner*—Huy D. Vu
*Assistant Examiner*—Phuongchau B Nguyen
(74) *Attorney, Agent, or Firm*—Withrow & Terranova, PLLC

(57) ABSTRACT

A wide-coverage, high-capacity, switching network is modeled after a classical space-time-space switch. In the switching network, each of the space stages comprises geographically distributed optical space switches and the time stage comprises a plurality of geographically distributed high-capacity electronic switching nodes. User-access concentrators, each supporting numerous users, access the network through ports of the distributed optical space switches. A user-access concentrator is a simple device which need only have a single access channel to access the network, although two or more access channels may be used. Such a user-access concentrator can communicate with a large number of other user-access concentrators by time-multiplexing the access channel.

39 Claims, 23 Drawing Sheets

DISTRIBUTED SPACE-TIME-SPACE SWITCH

FIELD OF THE INVENTION

The present invention relates to communication networks and, more particularly, to the architecture and control of a distributed space-time-space switch and a switching network modeled on such a switch.

BACKGROUND

Network expansion is motivated by the prospects of new applications requiring a much higher capacity than that required by today's applications and is facilitated by the abundance of data transport capacity (often called bandwidth) of the optical telecommunication medium. The realizable capacity of a telecommunication network is virtually unlimited. A network structure that enables virtually unlimited expansion while providing a high service quality is desirable and its introduction is overdue.

Current communication networks, however, are complex. For example, the current Internet is complex and inefficient, with limited scalability and service capabilities: scalability relates to the ability of a network to grow to handle increasing traffic and accommodate a greater number of nodes; service capabilities relate to the ability of a network to provide flexible intelligent services and quality guarantees of various types of service. The current Internet lacks the versatility required in a growing global multi-service network, and its structure prohibits its growth without tremendous complexity and expense. This is further complicated by the unduly complex protocols that are an accumulation of patchwork performed since the Internet's inception.

Advances in optical and electronic technology have eliminated the need for complex structures and complex controls of telecommunication networks. A versatile inexpensive network scaling to a capacity that is orders of magnitude higher than the capacity of the current Internet is now realizable using simple network structures. The limitations that have led to the complexity and inefficiency of the current data networks have now been traversed. Adopting a simple network structure would enable the construction of an economical wide-coverage high-capacity high-performance network and the introduction of advanced communication services.

Applicant's U.S. patent application Ser. No. 09/286,431 filed on Apr. 6, 1999 and titled "Self-Configuring Distributed Switch ", discloses a wide-coverage network of a composite-star structure that greatly simplifies network routing and control while facilitating growth to very high capacities. The disclosed network is based on adaptive wavelength channel allocation in an optical-core comprising several core nodes. To simplify the control functions, the core nodes operate independently from each other. The network is fully meshed and the paths have adaptive capacities. A technique for overcoming optical-switching latency in such a composite-star structure is described in U.S. Pat. No. 6,486,983, titled "Agile Optical-Core Distributed Packet Switch", issued to Beshai et al. on Nov. 26, 2002.

It is well known that fine switching granularity can reduce the number of hops in a network and, hence, increase network efficiency. On the other hand, it is also recognized that some applications are better served through channel switching. Therefore, it may be beneficial to provide a network of mixed granularity. Applicant's U.S. patent application Ser. No. 09/671,140 filed on Sep. 28, 2000 and titled "Multi-grained Network" describes a network which includes edge nodes interconnected by core nodes having distinctly different granularities. The edge nodes switch multi-rate data traffic. The core may include core nodes that switch fixed-size data blocks, core nodes that switch channels or bands of channels, and core nodes that switch entire links. A core node that provides fine granularity by time sharing—for example, by switching data blocks occupying short time slots—must have a low switching latency in order to enable efficient time-sharing of wavelength channels.

The networks disclosed in the aforementioned patent applications require that each edge node have a sufficient capacity to enable direct linkage to the core nodes. Traffic sources may then access the edge nodes directly.

With the advent of fast optical switching devices, it may be desirable to relax the requirement that each edge node be of high capacity so that edge nodes of widely-varying sizes may be used while still maintaining the precious property of a small number of hops from any traffic source to any traffic sink. This would require exploring new network structures.

SUMMARY

A distributed space-time-space switch is adapted from a known space-time-space switch. The structure of the distributed space-time-space switch may be expanded to serve as a wide-coverage, high-capacity, switching network. Advantageously, the switching network may be pre-configured in a manner that allows the switching of data traffic to happen predictably according to a wavelength chosen for a carrier of the data traffic at the edge of the network. In the switching network, each of the space stages may comprise geographically distributed optical space switches and the time stage may comprise a plurality of geographically distributed high-capacity electronic switching nodes. User-access concentrators, each supporting numerous users, may access the switching network through ports of the distributed optical space switches. A user-access concentrator is a simple device which need only have a single access channel to access the network. Such a user-access concentrator may communicate with a large number of other user-access concentrators by time-multiplexing the access channel.

According to an aspect of the present invention, there is provided a distributed space-time-space switch. The distributed space-time-space switch includes an electronic time-switching stage including a plurality of electronic time switches, an input stage including a plurality of upstream optical space switches, where each upstream optical space switch of the plurality of upstream optical space switches receives upstream input signals on a plurality of input channels and transmits upstream output signals to at least one electronic time switch of the plurality of electronic time switches and an output stage including a plurality of downstream optical space switches, where each downstream optical space switch of the plurality of downstream optical space switches is adapted to receive downstream input signals from at least one electronic time switch of the plurality of electronic time switches and transmit downstream output signals on a plurality of output channels.

According to another aspect of the present invention, there is provided a switching network. The switching network includes a plurality of electronic time switches, a wavelength router communicatively connected to each of the plurality of electronic time switches by a wavelength-division-multiplexed link, where the wavelength router is adapted to route received signals according to wavelength, and a plurality of optical space switches, wherein each optical space switch of the plurality of optical space switches is communicatively connected to the wavelength router by a wavelength-divisionmultiplexed link. Each of the optical space switches of the plurality of optical space switches includes an upstream optical space switch adapted to receive upstream signals from a plurality of user-access concentrators and switch the upstream signals toward the wavelength router. Each of the optical space switches of the plurality of optical space switches also includes a downstream optical space switch adapted to receive downstream signals from the wavelength router and switch the downstream signals toward the plurality of user-access concentrators.

According to a further aspect of the present invention, there is provided a switching network. The switching network includes a plurality of electronic time switches, a plurality of wavelength routers, each of the wavelength routers connecting to each of the plurality of electronic time switches by corresponding wavelength-division-multiplexed links, a plurality of optical space switches arranged in a plurality of groups, wherein each of the groups is associated with a given wavelength router of the plurality of wavelength routers and each optical space switch in each group of the plurality of groups communicatively connects to the associated given wavelength router by a wavelength-division-multiplexed link and a plurality of concentrators arranged in a plurality of concentrator sets, where each concentrator set in the plurality of concentrator sets is associated with a given optical space switch of the plurality of optical space switches.

According to a still further aspect of the present invention, there is provided a switching node. The switching node includes an input array of optical space switches, a middle array of switches including optical space switches and time-space switches and an output array of optical space switches, wherein each of the optical space switches in the input array has a link to each of the optical space switches in the middle array of switches, each of the optical space switches in the input array has a link to each of the time-space switches in the middle array of switches, each of the optical space switches in the middle array of switches has a link to each of the optical space switches in the output array and each of the time-space switches in the middle array of switches has a link to each of the optical space switches in the output array.

According to an even further aspect of the present invention, there is provided a method of communicating a control signal along a channel carrying a payload signal modulating a current wavelength. The method includes shifting the current channel from the current wavelength to a prescribed control wavelength, interrupting the payload signal and causing the control wavelength to be modulated with the control signal.

According to still another aspect of the present invention, there is provided a user-access concentrator. The user-access concentrator includes a traffic interface adapted to receive upstream signals from a plurality of traffic sources, a tunable optical transmitter adapted to produce a tunable optical carrier signal modulated with the upstream signals to give outgoing optical signals, a concentrator controller adapted to control a wavelength band of the optical carrier signal and an output port adapted to transmit the outgoing optical signals to an optical space switch.

According to still another aspect of the present invention, there is provided a controller for controlling a space switch. The controller is adapted to determine a switching schedule for operation of the space switch and transmit control signals representative of the switching schedule to a plurality of network elements.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention.

DETAILED DESCRIPTION

Figure 1:
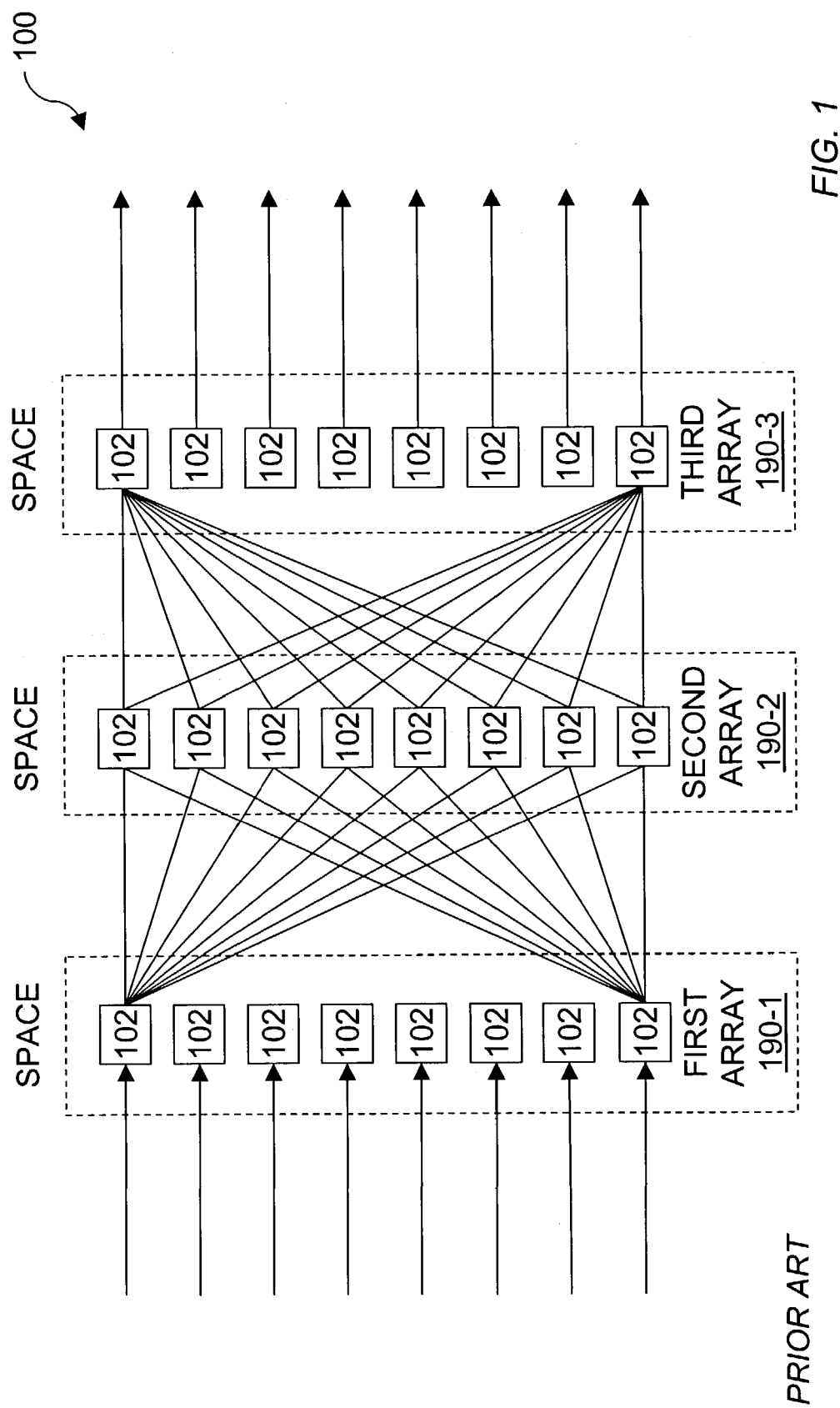
FIG. 1 illustrates a known three-stage channel switch.

Before describing embodiments of the present invention, a description of the concept and realization of time-locking is provided.

A first node X is said to be time-locked to a second node Y along a given path if, at any instant of time, the reading of a time counter at node X equals the sum of a reading of an identical time counter at node Y and the propagation time, normalized to the time counter cycle duration, along the given path from node X to node Y. The time counters at nodes X and Y have the same cycle duration. There may be several paths connecting the first node to the second node, and the paths may be defined by individual wavelengths in a fiber link or several fiber links. Due to the difference in propagation delays of different paths connecting the same node pair, time-locking must be realized for the different paths individually. Due to dispersion, time-locking of individual wavelength channels within the same WDM link may be required. When a first node is time-locked to a second node along a given path, the given path is said to be time-locked. It is noted that the methods and apparatus of the present invention apply to both channel switching and TDM switching.

The time-locking process in a time-shared network is described with the help of a two-node model. To realize time-locking of a first node to a second node in a network, the first node is provided with a first controller that includes a first time counter and the second node is provided with a slave controller and a master controller that includes a master time counter. The second node has several input ports and output ports and the master controller is connected to one of the input ports and one of the output ports. The first controller sends an upstream control burst to an input port of the second node during a designated time interval, the upstream control burst including a reading of the first time counter. The upstream control burst is sent in-band, together with payload data destined to output ports of the second node. The slave controller must be able to direct the upstream control burst to the master controller during a pre-scheduled time interval. The master controller has a device for acquiring and parsing upstream control bursts. The master controller compares the reading of the first time counter with a reading of the master time counter. An agreement of the two readings, or a negligible discrepancy, ascertains time alignment. The master controller reports reading discrepancies to the first controller which resets its time counter accordingly.

Time-locking an edge node to a reference node is realized by time-locking a time counter at the edge node to a time counter at the reference node. A time counter can be a conventional clock-driven counter. A time counter at an edge node may be an up-counter and a time counter at a reference node may be a down counter, the two counters have the same cycle duration. Using a 28-bit time counter, for example, driven by a clock of a clock period of 20 nanoseconds, the duration of the time counter cycle would be about 5.37 seconds ($2^{28}$ times 20 nanoseconds). The reading of an up-counter at an edge node increases, with each clock trigger, from 0 to 268,435,455 (0 to $2^{28}-1$) and the reading of a time counter at a reference node decreases, with each clock trigger, from 268,435,455 to 0. If the edge-node controller sends a timing message, when its reading is $K_1$, to a reference node, and the reading of the down-counter of the reference node at the instant of receiving the timing message is $K_2$, then the edge-node controller must reset its up-counter to zero when the up-counter reading reaches $[K_2+K_1]$ modulo $2^B$, B being the wordlength of the time counter (B=28 in the above example). If $K_2+K_1=2^B-1$, the edge node is already time-locked to the reference node.

Thus, within a network, all time counters have the same cycle duration and time-coordination can be realized through an exchange of time counter readings between each source node and a reference node to which the source node is connected. In a TDM (time-division multiplexing) switching network, the time counter readings may be carried in-band, alongside payload data destined to sink nodes, and sending each time counter reading must be timed to arrive at a corresponding reference node during a designated time interval.

FIG. 1 illustrates a known three stage channel switch 100 (a space-space-space switch, often abbreviated as an S-S-S switch) used for switching any input. channel from among a plurality of input channels to any output channel from among a plurality of output channels. The three array switch includes a first array 190-1, a second array 190-2 and a third array 190-3. Each of the three arrays 190-1, 190-2, 190-3 includes multiple identical space-switch modules 102.

A space-switch module is a bufferless switch that instantaneously connects any of several incoming channels to any of several outgoing channels. Space switches have graduated from electro-mechanical mechanisms with metallic contacts to electronic switches using integrated circuits, then to photonic-based switches.

Each of the space-switch modules 102 has dimension n×n, having n>1 input ports and n output ports, i.e., one input port and one output port for each of n space-switch modules 102. The three-stage switch 100 of FIG. 1 has a dimension of $n^2 \times n^2$, with an input capacity of $n^2$ channels and an output capacity of $n^2$ channels thus accommodating up to $n^2$ concurrent connections. Several variations of the architecture of the three stage channel switch 100 of FIG. 1 can be constructed, including a folded architecture and a double-folded architecture. In the folded architecture arrangement, the first array 190-1 and the third array 190-3 of the three-stage structure are combined so that each first-array space-switch module 102 pairs with a third-array space-switch module 102 to form a combined (2×n)×(2×n) space-switch module. In the double-folded architecture arrangement, a single array of space-switch modules may be used, with each space-switch module connecting directly to each other space-switch module to form a full mesh. In the unfolded arrangement of FIG. 1, a path from an input channel to an output channel must traverse three switch modules 102, one switch module 102 in each of the three arrays 190-1, 190-2, 190-3. In a folded arrangement, a single switch module is traversed if the input channel and the output channel are connected to the same switch module. Otherwise, a path traverses three switch modules as in the case of the unfolded arrangement. In a double-folded arrangement, a path from an input channel to an output channel may traverse a single switch module, two switch modules or three switch modules, as described in U.S. patent application Ser. No. 10/223,222 filed on Aug. 20, 2002, and titled "Modular High-Capacity Switch".

Figure 2:
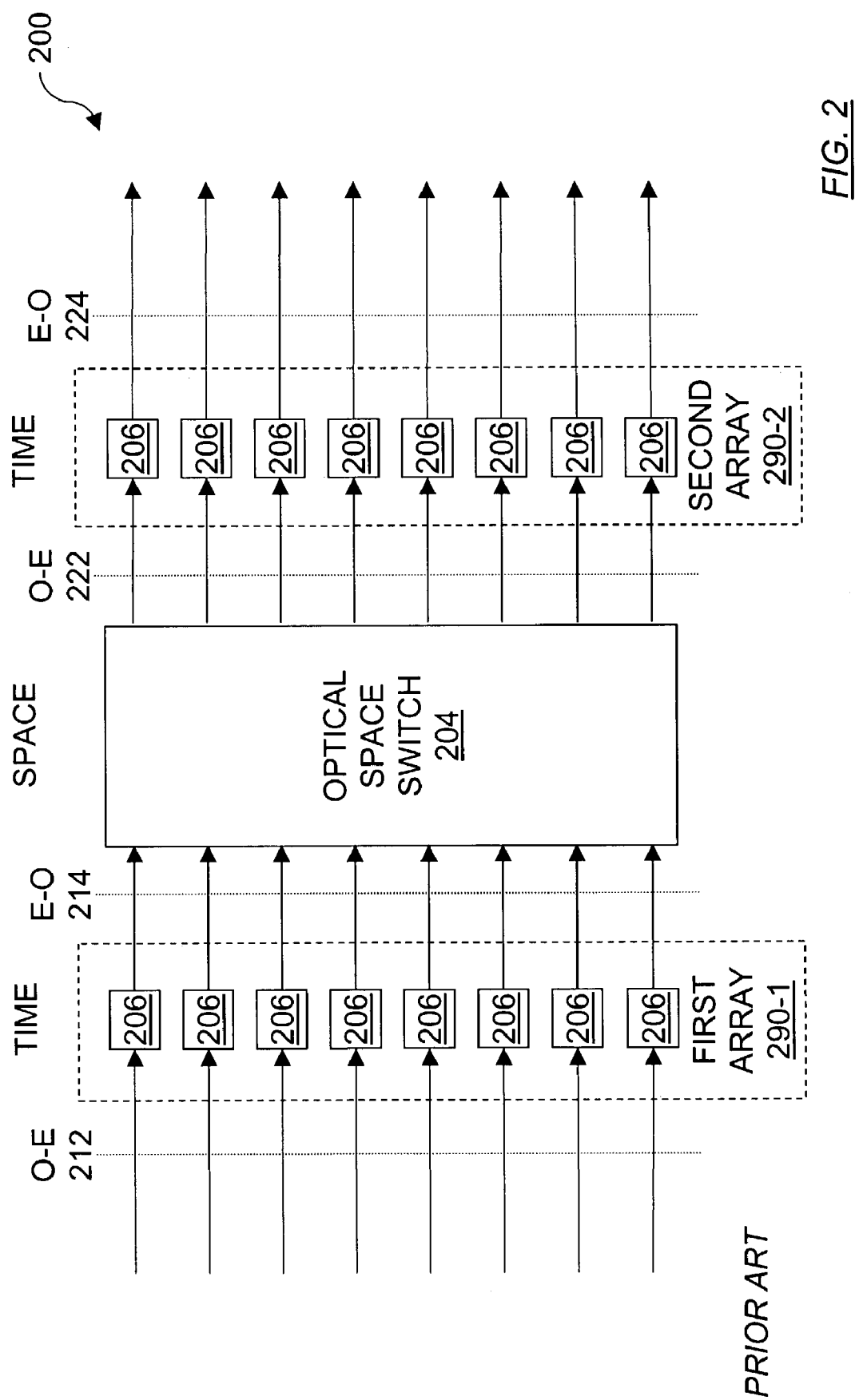
FIG. 2 illustrates a known time-space-time switch used for fine-granularity switching of time-slotted signals.

FIG. 2 illustrates a (known) classical time-space-time switch 200, often referenced as T-S-T switch, which has been extensively used for time-division-multiplexing (TDM) switching with the space stage implemented as electronic switches. An incoming optical signal in a channel is converted to an electrical signal by a first optical-to-electric converter 212. The electrical signal is then received by a time-switching module 206 in a first switching array 290-1.

A time-switching module 206 receives signals that are arranged in a time frame having a predefined number of time slots. A signal contained within a time-slot has a predefined destination.

The space switch 204 may be electronic or optical. When space switch 204 is implemented as an optical switch, the electrical signal at the output of the time-switching module 206 is converted to an optical signal by a first electrical-to-optical converter 214. The resultant optical signal is then received by an optical space switch 204. After switching in the optical space switch 204, the switched optical signal is converted to an electrical signal by a second optical-to-electrical converter 222 and subsequently received by a time-switching module 206 in a second switching array 290-2. The electrical signal at the output of the time-switching module 206 is converted to an optical signal by a second electrical-to-optical converter 214. A scheduling processor (not illustrated) performs a time-slot matching process between the first switching array 290-1 and the second switching array 290-2.

An adapted version of the classical time-space-time switch 200 of FIG. 2 used for packet switching is also well known in the art (see, for example U.S. Pat. No. 5,168,492 issued on Dec. 1, 1992, to Beshai et al., U.S. Pat. No. 5,475,679 issued on Dec. 12, 1995, to Münter, and U.S. Pat. No. 5,745,486 issued on Apr. 28, 1998, to Beshai et al.)

Figure 3:
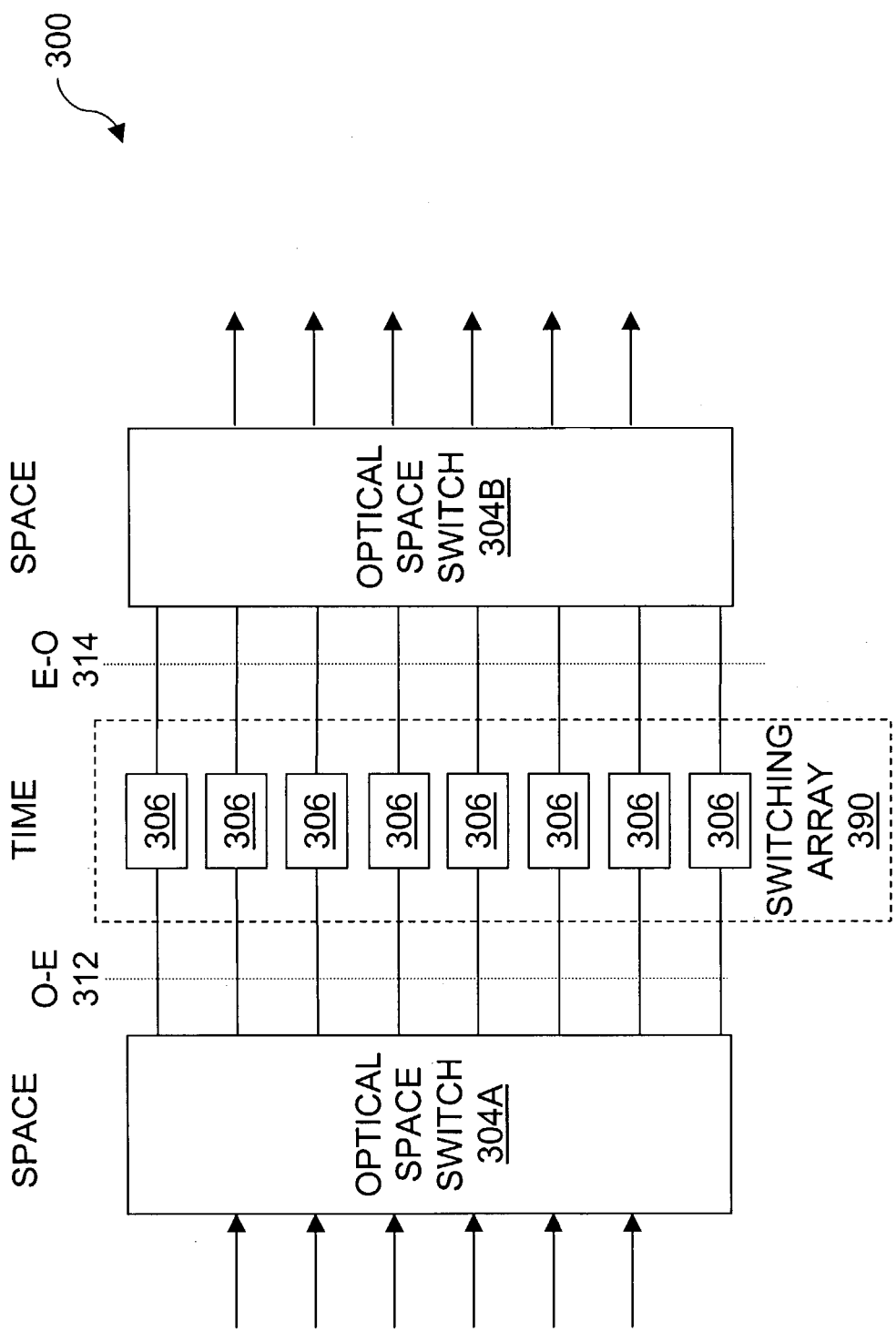
FIG. 3 illustrates a known space-time-space switch used for fine-granularity switching of time-slotted signals.

FIG. 3 illustrates a known switch 300, having an architecture known as the space-time-space (S-T-S), which has been employed for TDM switching. Historically, the S-T-S TDM switch 300 of FIG. 3 has been less popular than its T-S-T counterpart (see FIG. 2) because a time-switching module 206 is quite simple to construct and the T-S-T uses fewer space switching modules and more time-switching modules in comparison with an S-T-S switch of the same capacity.

The S-T-S TDM switch 300 of FIG. 3 comprises two optical space switches 304A, 304B, connected by a switching array 390 of time-switching modules 306. The first optical space switch 304A has n>1 inlet ports and m≧n>1 outbound ports while the second optical space switch 304B has m inbound ports and n outlet ports. Each outbound port transmits data to one of the time-switching modules 306 and each inbound port receives data from one of the time-switching modules 306. When optical space switching is employed, the S-T-S TDM switch 300 of FIG. 3 may be less expensive than the T-S-T TDM switch 200 of FIG. 2 because only one optical-to-electrical conversion and only one electrical-to-optical conversion are required.

The scalability of the T-S-T switch 200 of FIG. 2 and the S-T-S switch 300 of FIG. 3 is limited by the scalability of the space switching stages. The scalability can be enhanced significantly by replacing the pure time-switching modules 206, 306 by time-space switching modules, where each time-space switching module has several input ports and several output ports. A good example of a time-space switching module is a known common-memory switch to be described below.

A common-memory switch relies on massive data parallelism to enable high-speed data storage and retrieval. Data is stored in a common-memory comprising parallel memory devices which are identically addressed. The common-memory switch may have several input ports and several output ports. At any instant of time, only one input port may have exclusive write access to the common-memory, or only one output port may have a read access to the common-memory. In a common-memory switch, there is no internal congestion and input data is guaranteed a path to its desired output port. In one implementation, a time-frame having a predefined number of time slots is used to coordinate memory access among the input ports and the output ports.

Known common-memory switching devices use fixed size data blocks, such as ATM (asynchronous transfer mode) cells or STM (synchronous transfer mode) data blocks. For example, U.S. Pat. No. 5,144,619 titled "Common memory switch for routing data signals comprising ATM and STM cells", issued to Münter on Sep. 1,$^{st\ 1992}$, describes a common memory switch that handles data segments of a fixed size. U.S. Pat. No. 6,118,792 titled "Method and Apparatus for a Flexible-Access Rate Common-Memory Packet Switch", issued on Sep. 12, 2000 to Beshai, describes a common-memory switch having a plurality of input ports and a plurality of output ports where the sum of the capacities of the input ports may exceed the internal capacity of the switch as determined by the speed of the common memory and the sum of the capacities of the output ports may also exceed the internal capacity of the switch. An implicit concentration stage is realized by adaptively allocating permissible access rates for each input port. Each input port transfers data segments of equal size to the common memory at specified time slots and the allocated access rate of each port is based on the fixed data-segment size. The allocated access rate for an input port applies to the total traffic received at the input port.

Figure 4:
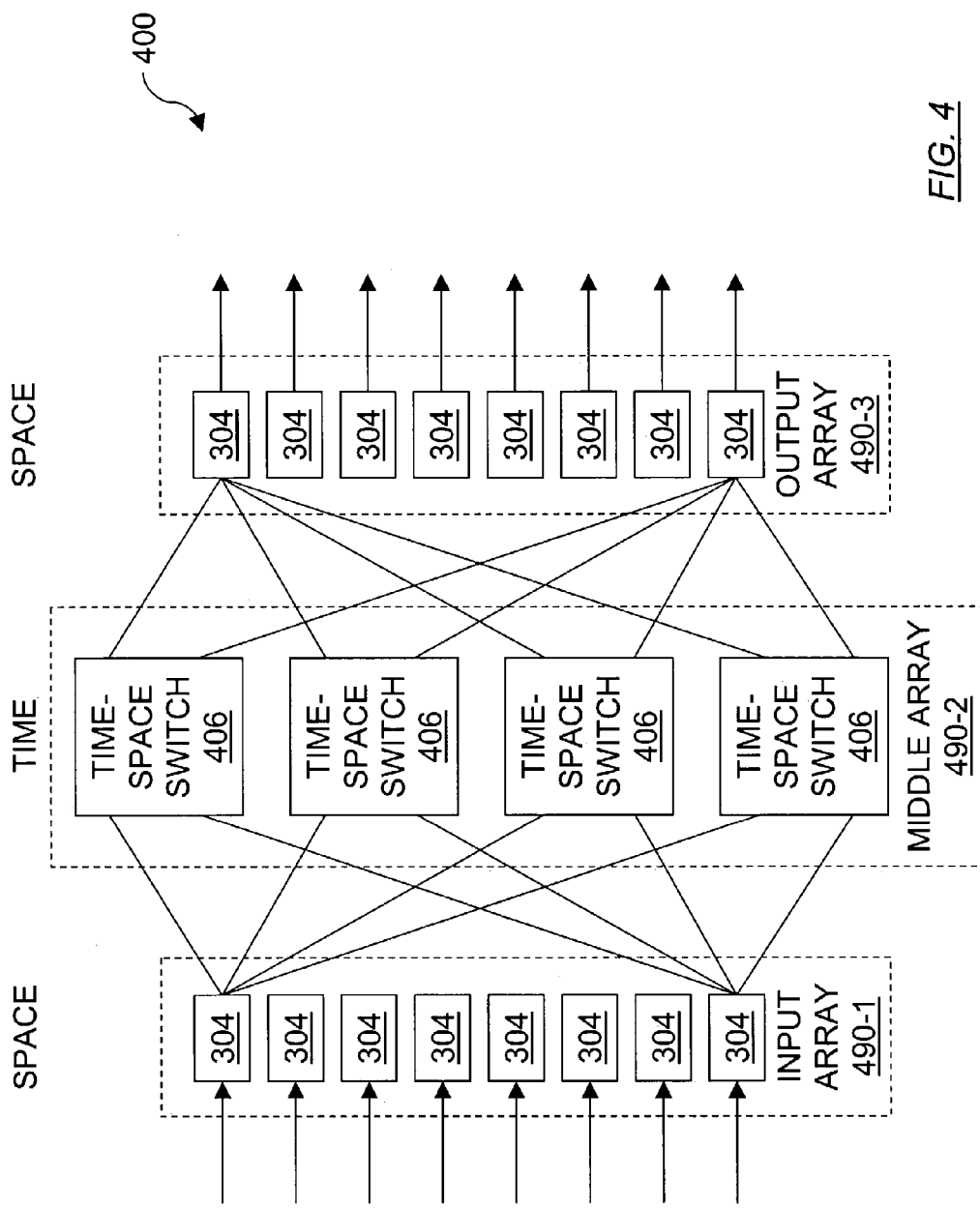
FIG. 4 illustrates an alternative space-time-space switch adapted from the space-time-space switch of FIG. 3.

FIG. 4 illustrates a structure of an alternative S-T-S switch 400 adapted from the S-T-S switch 300 of FIG. 3. Rather than the single optical space switch 304 at the input stage, an input array 490-1 of optical space switches 304, each identical to the optical space switches 304A, 304B of FIG. 3, is used as an input stage. A middle stage is made up of a middle array 490-2 of 8×8 time-space switching modules 406, each implemented, for example, as a common-memory switch as described above. An output stage mimics the input stage by using an output array 490-3 of optical space switches 304. Although only two optical space switches 304 in each of the input array 490-1 and the output array 490-3 are shown to connect to the time-space switches of the middle stage, this arrangement is merely for simplicity of illustration. It should be understood that each of the optical space switches 304 in the input stage connects to all of the 8×8 time-space switching modules 406 in the middle stage and that each of the optical space switches 304 in the output stage connects to all of the 8×8 time-space switching modules 406 in the middle stage.

Time-space switches of a dimension larger than 8×8 may also be used. For example, the S-T-S switch 400 of FIG. 4 comprises eight input space switches 304, eight output space switches 304 and four 16×16 time-space switches 406. The S-T-S switch 400 can be viewed as a superposition of eight S-T-S switches 300 which interconnect through the four 16×16 time-space switches 406. Each input space switch 304 connects to each time-space switch 406, and each time-space switch 406 connects to each output optical switch 304. An input space switch 304 may connect to a time-space switch 406 through two wavelength channels and a time-space switch. 406 may connect to each output space switch 406-B through two wavelength channels. Alternatively, eight time-space switches 406 each of dimension 8×8 may be used to interconnect the input space switches 304 to the output space switches 304. An input space switch 304 then connects to a time-space switch 406 through one wavelength channel and a time-space switch 406 connects to each output space switch 406-B through one wavelength channel.

A time-space switching module operates under control of a switching schedule. Such a switching schedule may be defined for a time frame that includes a series of time slots. The switching schedule determines input-output connectivity during each time slot. Through such reconfiguration, a particular input channel may be connected to a given output channel during one time slot and connected to another output channel during another time slot.

Figure 5:
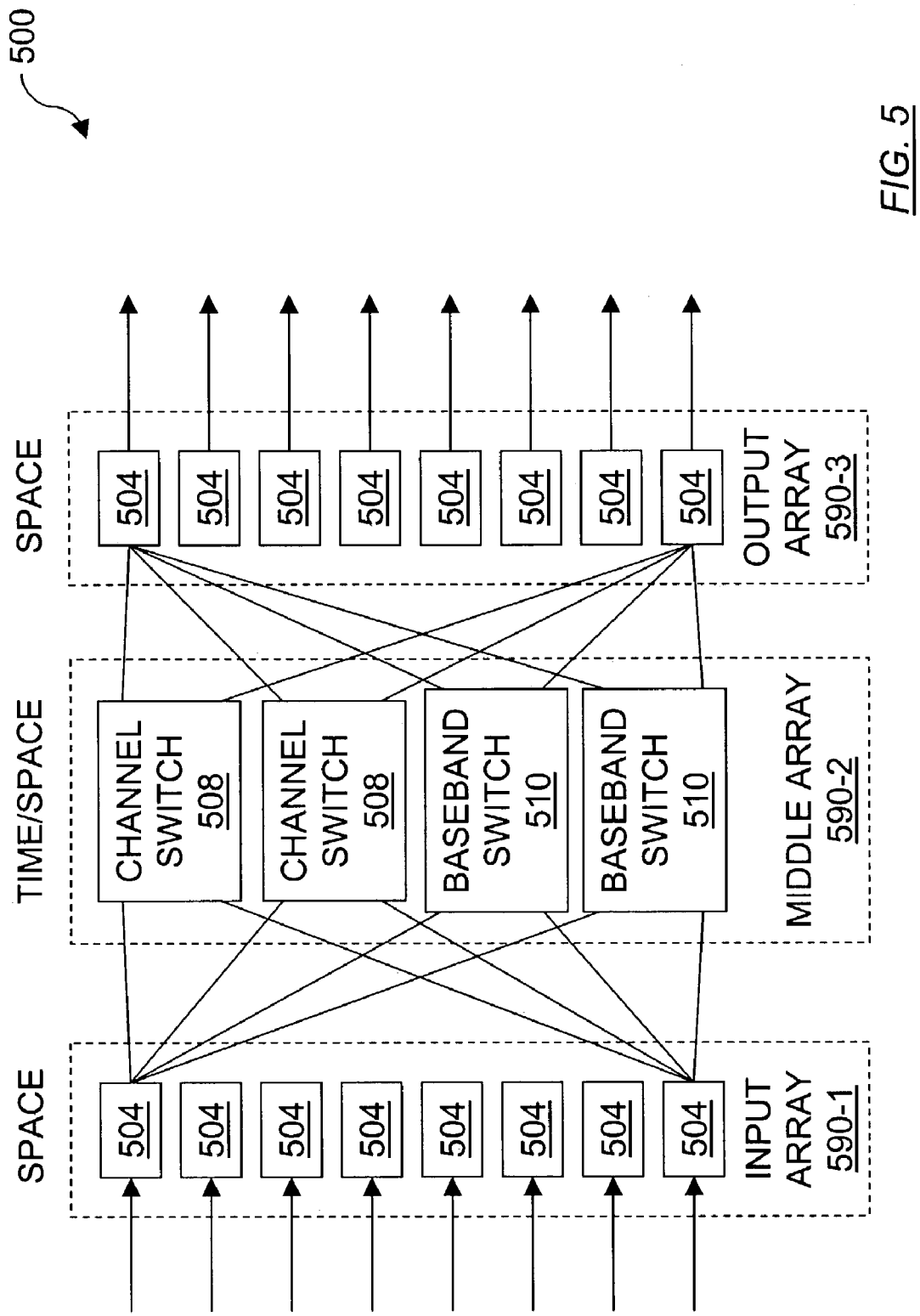
FIG. 5 illustrates a combination switching node combining, according to an embodiment of the present invention, the features of the switches of FIG. 1, FIG. 3, and FIG. 4, where a middle stage comprises a set of channel switches and a set of baseband switches.

FIG. 5 illustrates a structure of a combination switching node 500 that combines an S-T-S switch and an S-S-S switch in one structure. An input array 590-1 includes a number of optical space switches 504 each connected to all of the switches of a middle array 590-2. The middle array 590-2 includes channel switches 508 and baseband switches 510. The switches of the middle array 590-2 are, in turn, connected to all of the switches of an output array 590-3. Like the input array 590-1, the output array 590-3 includes a number of optical space switches 504. The combination switching node 500 of FIG. 5 thus allows switching of an entire channel from an inlet port to an outlet port through the channel switches 508 of the middle array 590-2, or switching of time-slotted signals, through the time-space switches (baseband switches 510) of the middle array 590-2.

Given that each channel accommodates an optical carrier of a particular wavelength modulated by an information signal, a distinction can be drawn between the channel switches 508 and the baseband switches 510 of the middle array 590-2 as follows. A given channel switch 508 receives an optical signal in a channel of a particular wavelength band from one of the space switches 504 in the input array 590-1 and transmits the entire optical signal carried by the channel to a configured destination one of the space switches 504 in the output array 590-3. The transmitted optical signal may be shifted to another wavelength band. A given baseband switch 510 receives a time-divided channel in a particular wavelength band from one of the space switches 504 in the input array 590-1 and transmits, for the duration of each time slot, the information signal, in a wavelength band appropriate to the configured destination one of the space switches 504 in the output array 590-3.

It is to be noted that, in the structure of FIG. 3 or FIG. 4, the space switches 304 may be electronic space switches, optical space switches, or a mixture of electronic and optical space switches. The channel switches 508 of the structure of FIG. 5 may also be electronic, optical, or a mixture of electronic and optical space switches.

Figure 6:
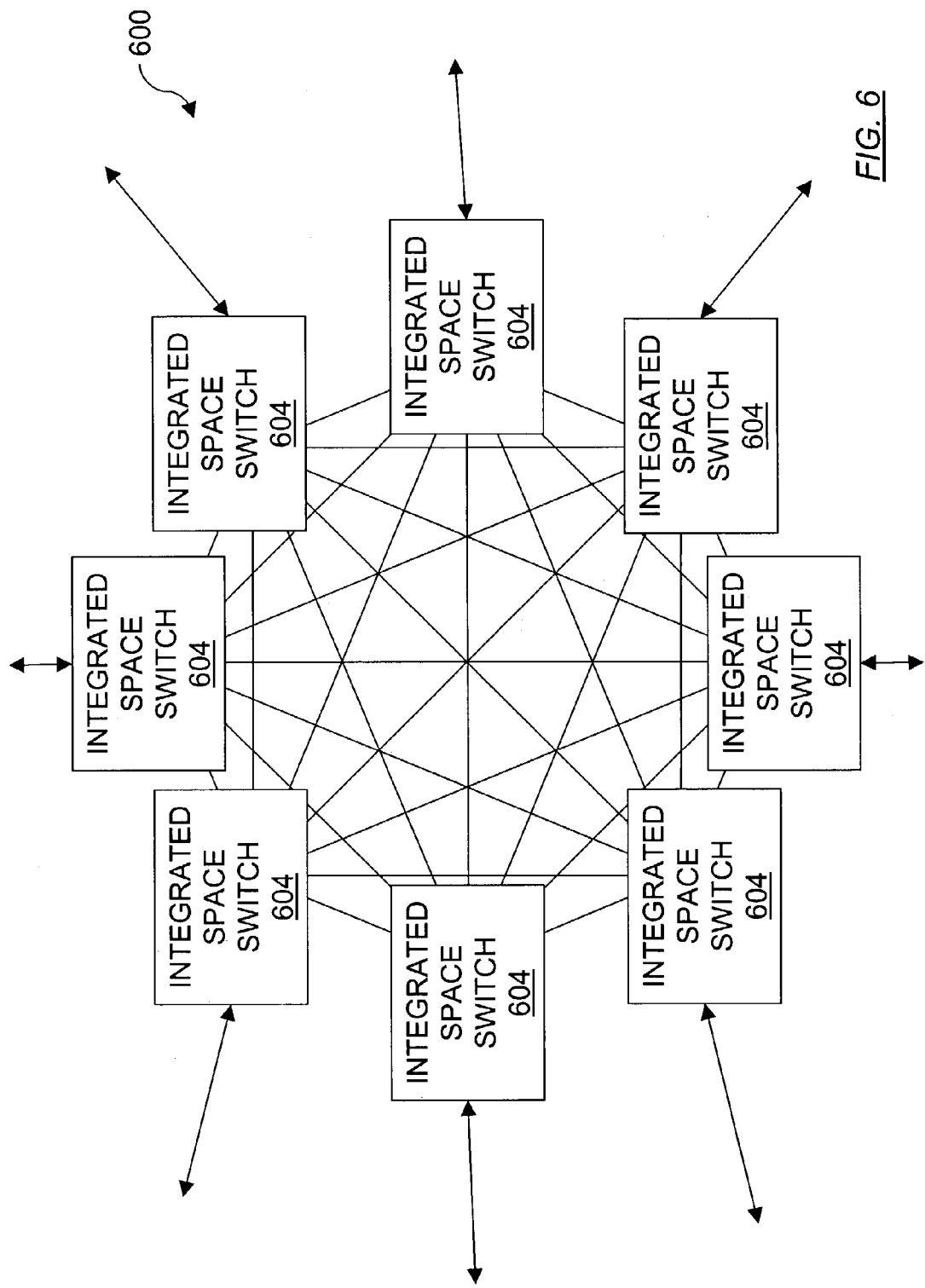
FIG. 6 illustrates a switch structure derived by rearranging the structure of FIG. 5.
Figure 7:
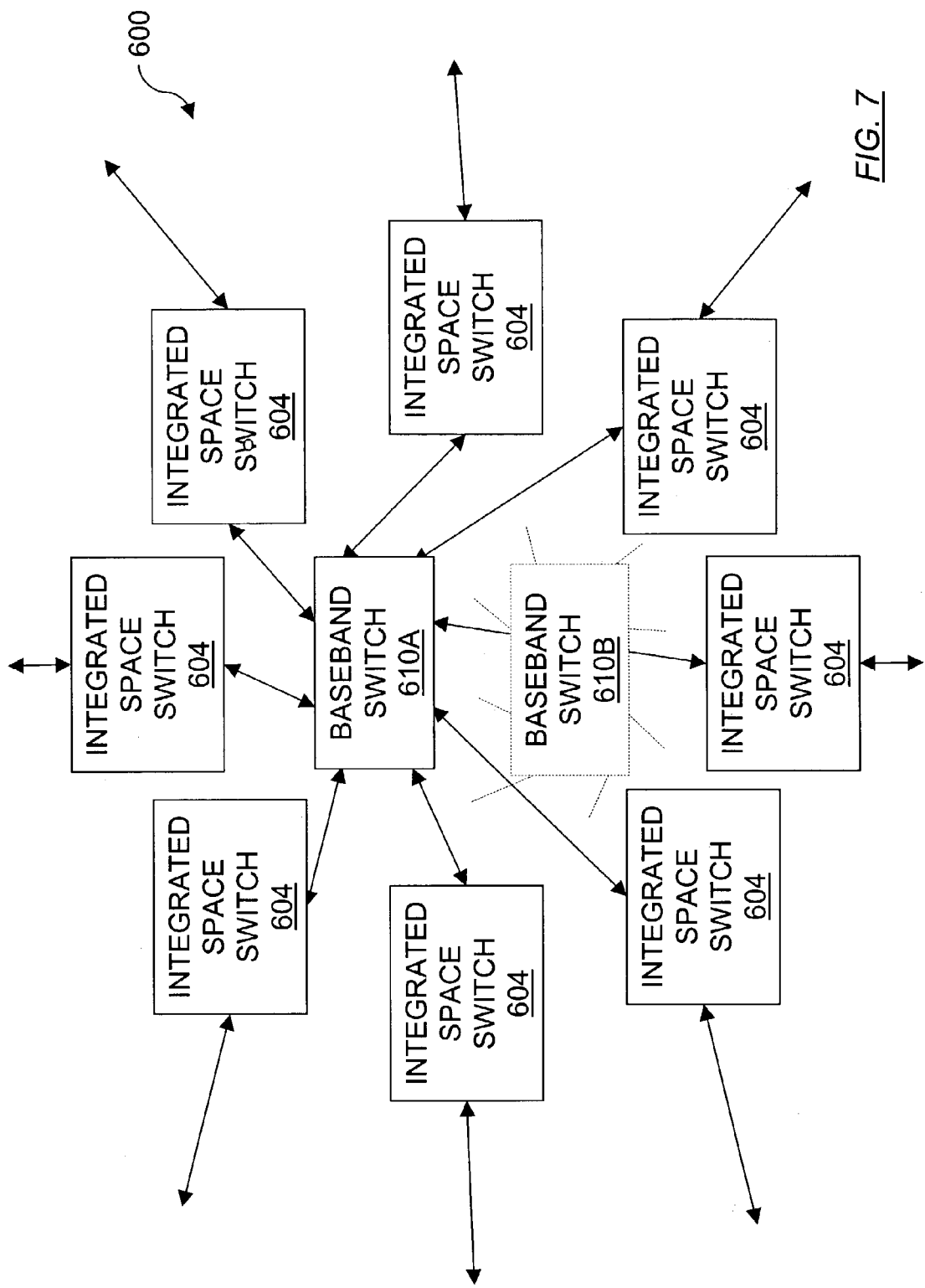
FIG. 7 illustrates a switch structure of FIG. 6 including baseband switching modules and related connections.

FIG. 6 illustrates a switch structure 600 derived by rearranging the outer space switches and the channel switches (space switches) of the middle array 590-2 in structure of FIG. 5. In the. structure 600 of FIG. 6, a single, integrated, space-switch module 604 performs the functions of a space switch 504 in the input array 590-1, a channel switch 508 in the middle array 590-2 and a space switch 504 in the output array 590-3 of the combination switching node 500 of FIG. 5. The integrated modules 604 are connected in a mesh structure. In FIG. 7, connections of the switch structure 600 are shown between the integrated modules 604 and a baseband switch modules 610A. Another baseband switch module 610B is likewise connected. For simplicity of illustration, the baseband switch modules 610 and related connections are omitted in FIG. 6. Each baseband switch module 610 is connected to each of the integrated modules and functions as one of the baseband switches 510 of the middle array 590-2, in a folded structure.

A channel or time-shared connection from an input of a first integrated module 604 to an output of a second integrated module 604 may be switched internally, if the second integrated module 604 is also the first integrated module 604. A channel connection may either traverse only the first and second integrated modules 604, or be routed through an intermediate integrated module 604. A time-shared connection from an input of an integrated module 604 to an output of another integrated module 604 can be switched through one of the baseband modules 610.

Figure 8:
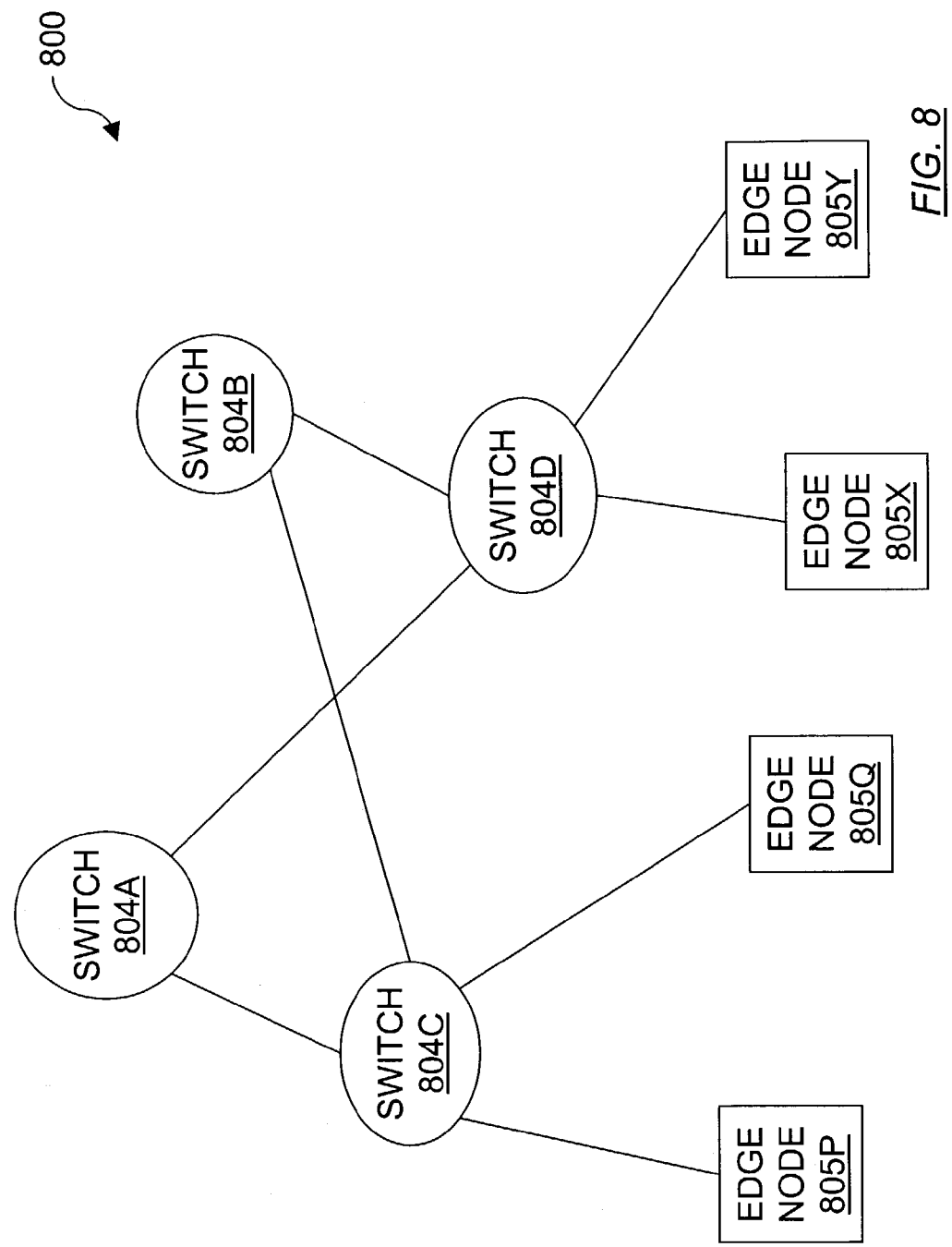
FIG. 8 illustrates a network of edge nodes and bufferless core switches, used to illustrate the difficulty of time-locking paths each traversing more than one bufferless switch.

A network 800 of bufferless switches 804A, 804B, 804C, 804D (individually or collectively 804) and subtending edge nodes 805P, 805Q, 805X, 805Y (individually or collectively 805) is illustrated in FIG. 8. In order for a time slot within a time frame to be switched, at a bufferless switch 804, to the appropriate sink node, timing is critical. The source node or switch of the time frame should be "time-locked" to the bufferless switch 804 that is to perform the switching. The time-locking necessary to properly switch a time slot within a time frame across a path including more than one bufferless switch 804 can be difficult to establish, as will be illustrated with reference to FIG. 9.

To establish time-locking between a first network element (node or switch) and a second network element, one of the network elements may be designated a master and the other network element may be designated a slave. Each of the two network elements includes a time counter. Each time counter has a predefined word-length; 24 bits for example. Such time counters are cyclic, each counting up to a maximum value before resetting to zero. Alternatively, such counters, called down counters, could start at the maximum value and count down to zero (often called down counters). The slave time counter and the master time counter may have the same number of bits and may be controlled by a clock running at the same rate. Through control signaling, the slave network element can time-lock the slave time counter to the master time counter.

The master time counter may, for instance, define a master cycle with a starting point of time zero. Consider a scenario wherein the slave time counter is locked to the master time counter. If the slave network element starts to send a time frame at time zero on the slave time counter, the time frame will, because of a distance traveled by the time frame, arrive at the master network element some time after time zero on the slave time counter. Once the time-locking procedure has been applied, the time at which the time frame is transmitted by the slave network element is adjusted such that the time frame sent from the slave network element arrives precisely at a designated time with respect to the master time counter, as will be detailed below. This requires that the cycle duration of each time counter exceed the round-trip delay between the slave and master time counters.

In order to effect time-locking, the slave network element may send a control signal to the master network element, where the control signal indicates the reading of the slave time counter at the time of sending. The master network element, upon receiving the control signal, may compare the indication of the reading on the slave time counter with the reading on the master time counter at the time of receipt of the control signal. The master network element may then send the slave network element a control signal indicating an amount by which to adjust the slave time counter in order that a time frame sent at a given slave time counter reading will arrive at the master network element at a time at which the reading of the master time counter is identical to the given slave time counter reading. In one implementation, described in the aforementioned U.S. patent application Ser. No. 09/286,431, the master network element sends the master time counter reading, which is used by the slave controller to reset the slave time counter.

Figure 9:
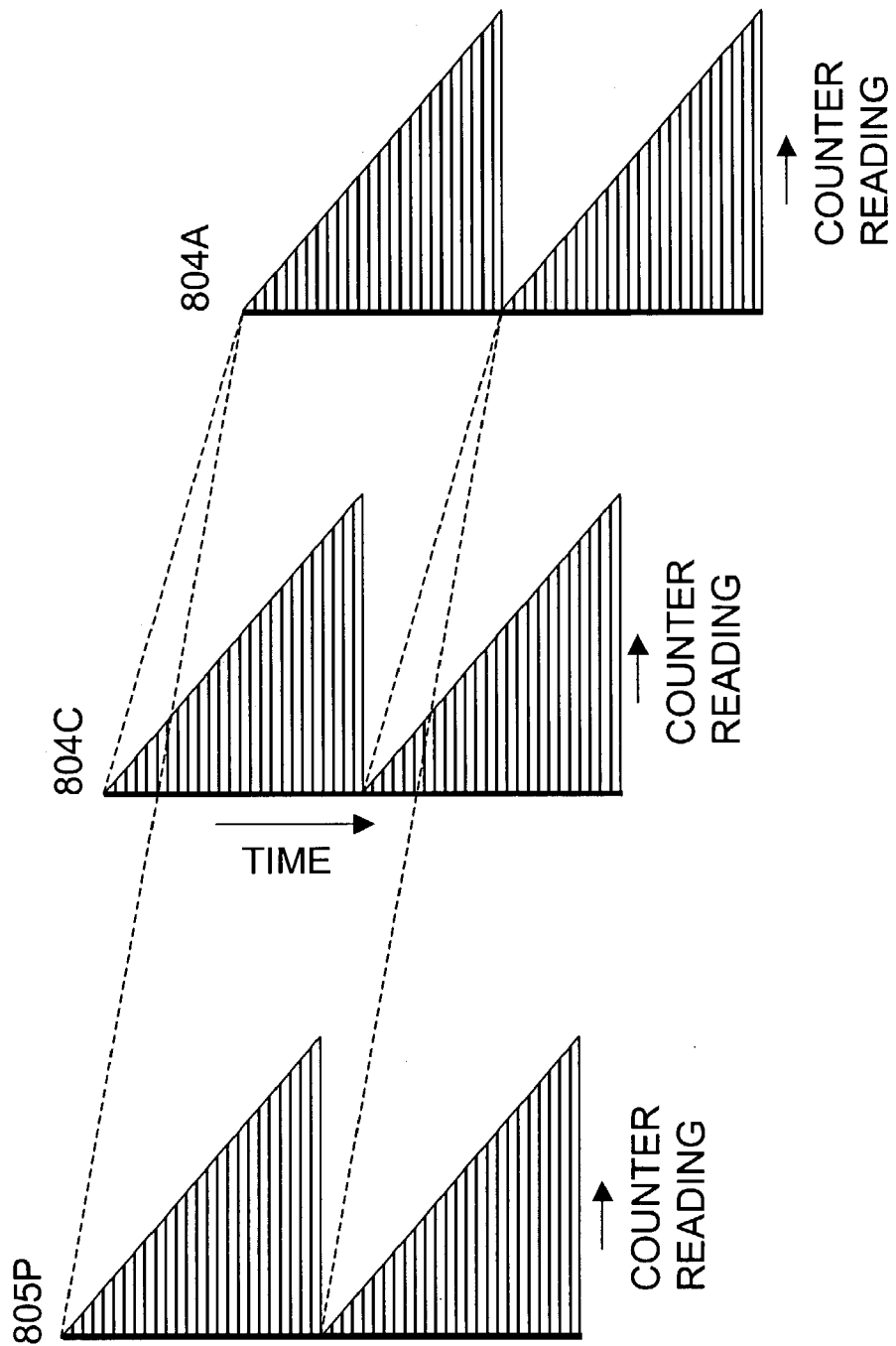
FIG. 9 illustrates an aspect of a time-locking process.

FIG. 9 illustrates an arrangement of time counters wherein one of the bufferless space switches 804C and one of the edge nodes 805P of FIG. 8 (acting as slave network elements) are independently time-locked to another bufferless space switch 804A (acting as a master network element).

Returning to FIG. 8, it is notable that time counters at the bufferless space switches 804C and 804D may time-lock to a time counter at the bufferless space switch 804A, time counters at the nodes 805P, 805Q can time-lock to time counters at the bufferless space switches 804C and 804A and time counters at the edge nodes 805X, 805Y can time-lock to time counters at the bufferless space switches 804D, 804A. Further, while time-locked to a time counter at the bufferless space switch 804A, time counters at the bufferless space switches 804C, 804D and edge nodes 805P, 805Q, 805X, 805Y cannot time-lock to a time counter at the bufferless space switch 804B, except by coincidence.

Let bufferless space switch 804A be a master network element. Then time counters at bufferless space switches 804C and 804D may time-lock directly to a time counter at bufferless space switch 804A. Time counters at edge nodes 805P, 805Q can time-lock directly to a time counter at bufferless space switch 804C, and hence be time-locked to the time counter at bufferless space switch 804A. Time counters at edge nodes 805X, 805Y can time-lock directly to the time counter at bufferless space switch 804D, and hence be time-locked to the time counter at bufferless space switch 804A. In this case, the time counters at bufferless space switches 804C and 804D, would not time-lock to a time counter at bufferless space switch 804B except by coincidence. It follows that, while time-locked to a time counter at the bufferless space switch 804A, the time counters at edge nodes 805P, 805Q, 805X, 805Y would not time-lock to the time counter at bufferless space switch 804B, except by coincidence.

Figure 10:
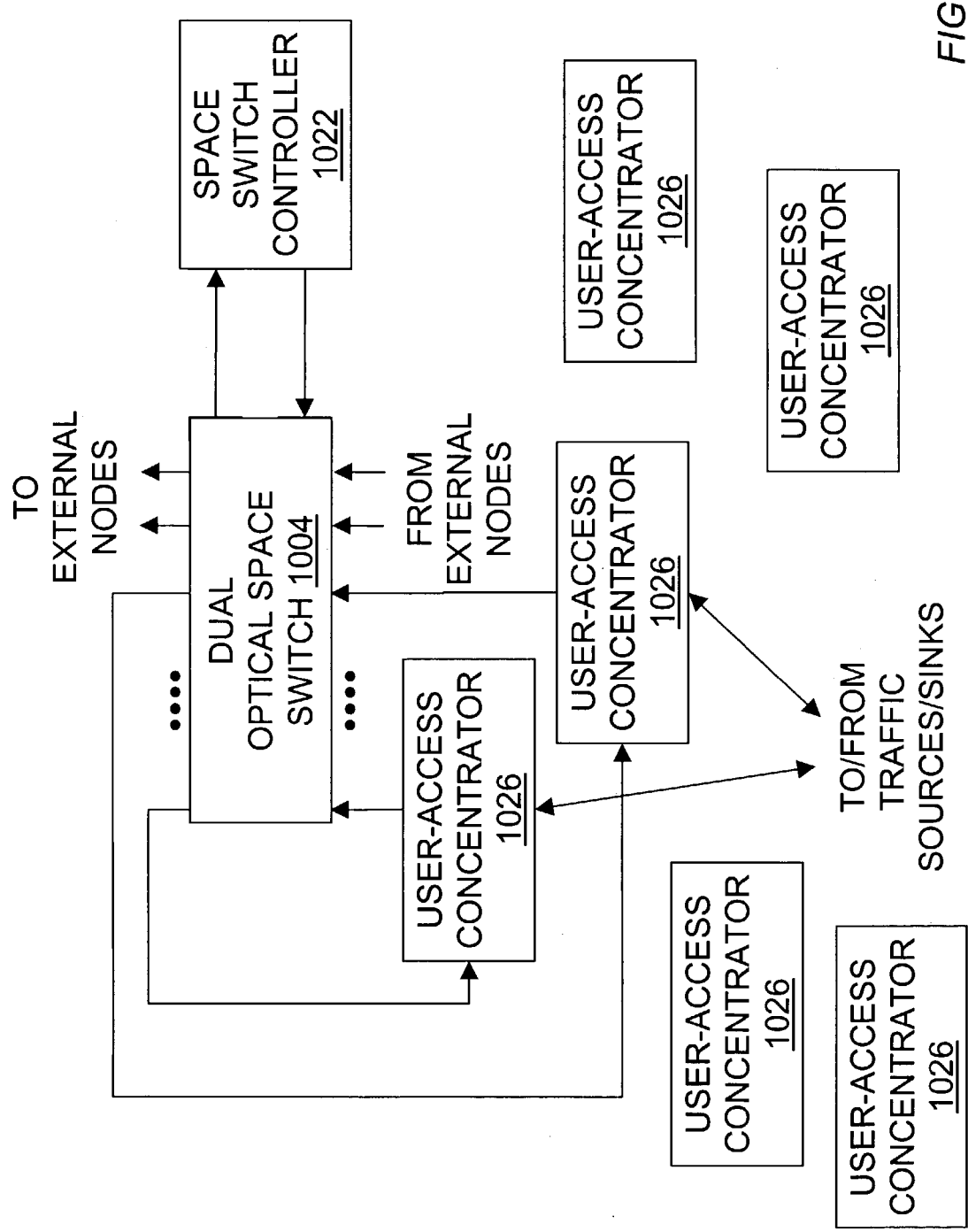
FIG. 10 illustrates the connection of user-access concentrators to a dual space switch according to an embodiment of the present invention.

FIG. 10 illustrates a dual optical space switch 1004 and related devices. The dual optical space switch 1004 comprises an upstream space switch and a downstream space switch (not illustrated in FIG. 10). The upstream and downstream space switches may be integrated to share a common switching fabric and a common controller. The dual optical space switch 1004 receives input channels from a number of network elements, including user-access concentrators 1026 and external nodes. Similarly, the dual optical space switch 1004 transmits output channels to network elements, including the user-access concentrators 1026 and external nodes. As such, traffic from the user-access concentrators 1026 may be switched, by the dual optical space switch 1004, to other user-access concentrators 1026 or to external nodes. Similarly, traffic from external nodes may be switched to other external nodes or to user-access concentrators 1026. The user-access concentrators 1026 receive input from multiple traffic sources and organize the received input into a single channel for presentation to the dual optical space switch 1004. The user-access concentrators 1026 also receive input from the dual optical space switch 1004 and organize the received input for transmission to multiple traffic sinks. The operation of the dual optical space switch 1004 is controlled by a space switch controller 1022, which includes a controller time counter. At least one output port from optical space switch 1004 connects to the space-switch controller. This output is, understandably, optical and, therefore, must be converted to an electrical signal before being processed by the space switch controller 1022. An optical to electrical converter is provided within the space switch controller 1022 for that conversion. Similarly, an electrical to optical converter is provided within the space switch controller 1022 for conversion between the space switch controller 1022 and the dual optical space switch 1004.

Figure 11:
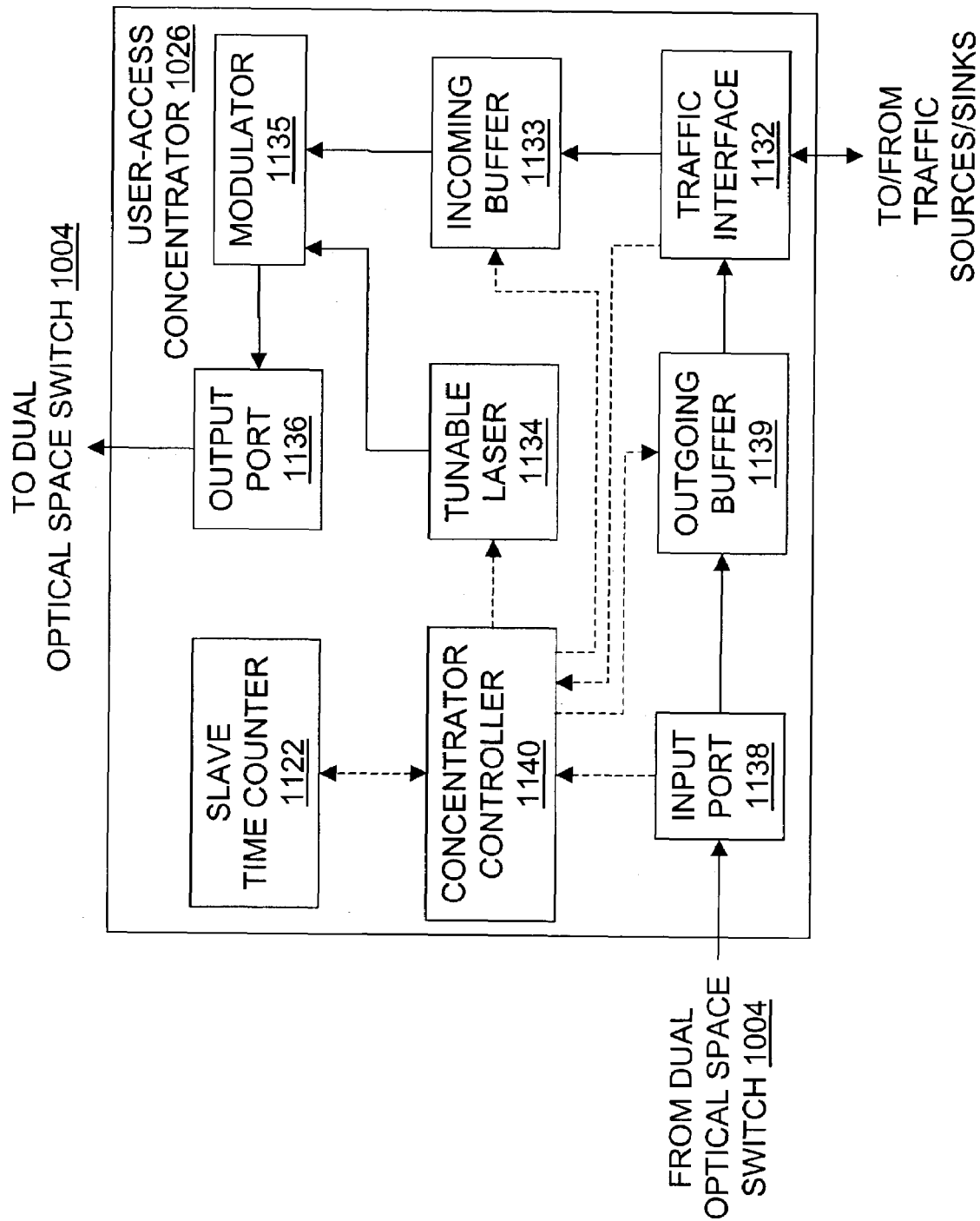
FIG. 11 illustrates the structure of an exemplary one of the user-access concentrators of FIG. 10 according to an embodiment of the present invention.

An exemplary one of the user-access concentrators 1026 of FIG. 10 is illustrated in FIG. 11. Traffic is received from, and transmitted to, traffic sources and sinks at a traffic interface 1132. The solid inter-module lines in FIG. 11 generally indicate payload-signal paths while the dashed lines indicate control-signal paths. The traffic interface 1132 passes a signal received from a traffic source to an incoming buffer 1133; the incoming buffer is an electronic buffer. A concentrator controller 1140 acts to organize, as will be further discussed hereinafter, the received payload signals for presentation to the dual optical space switch 1004 via an output port 1136. In particular, the concentrator controller 1140 directs the release of traffic from the incoming buffer 1133 to a modulator 1135. The modulator receives an optical signal carrier to modulate from a tunable laser 1134, where the wavelength of the optical signal carrier received from the tunable laser 1134 is under control of the concentrator controller 1140. The output of the modulator 1135 is passed to the output port 1136.

Return signals from the dual optical space switch 1004 are received at an input port 1138. Where the return signals are destined for the traffic sinks, the return signals are passed to an outgoing buffer 1139 before being transmitted to the traffic sinks by the traffic interface 1132. Where the return signals are control signals that have originated at, for instance, the space switch controller 1022, the control signals may be sent to the concentrator controller 1140 to control the operation of the user-access concentrator 1026, in general. In particular, some of the control signals may relate to the operation of the tunable laser 1134 and the input buffer 1133, while others of the control signals may relate to the operation of a slave time counter 1122.

Figure 12:
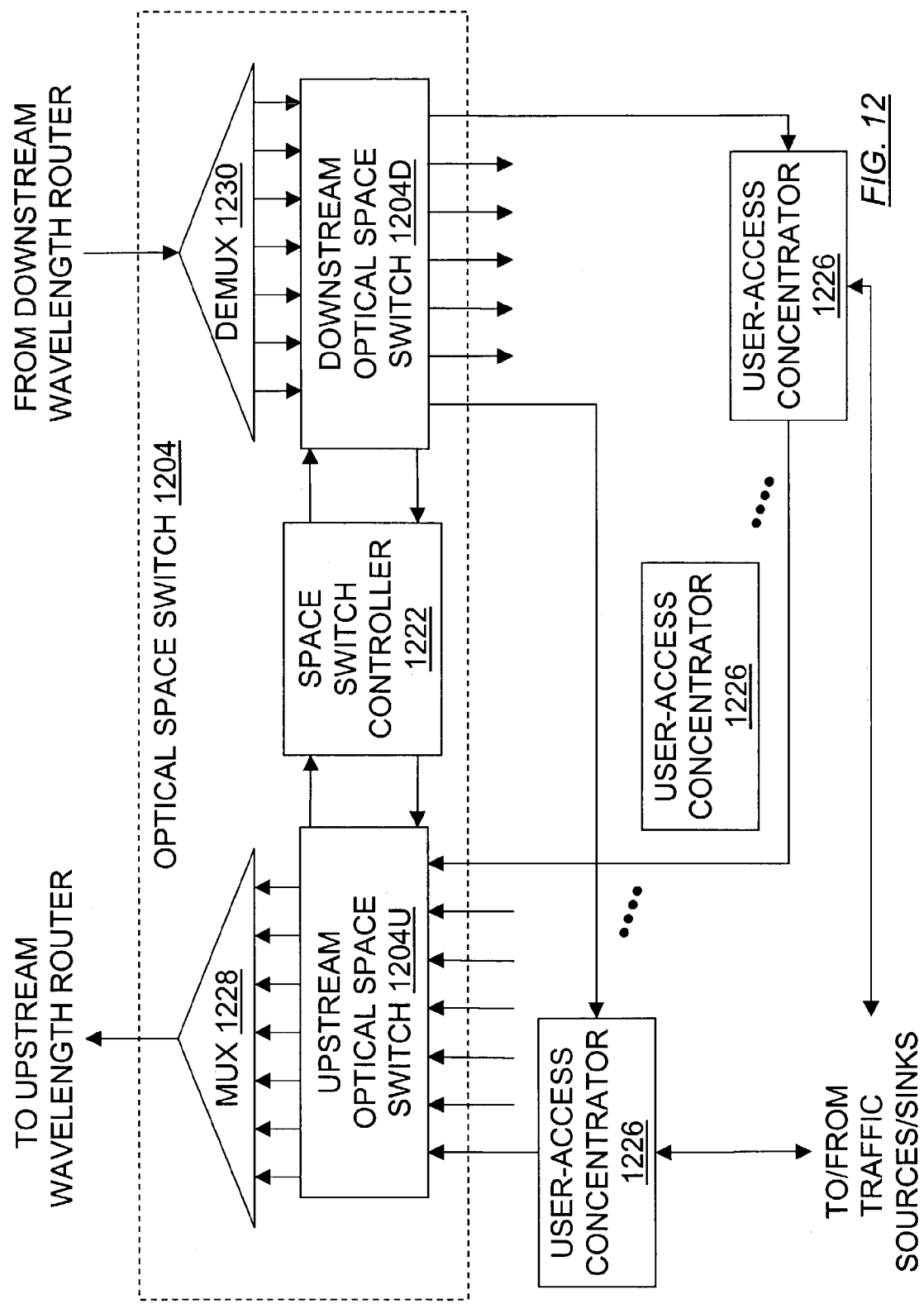
FIG. 12 illustrates the structure of an optical space switch, including a space switch controller, in communication with user-access concentrators and wavelength routers according to an embodiment of the present invention.
Figure 19:
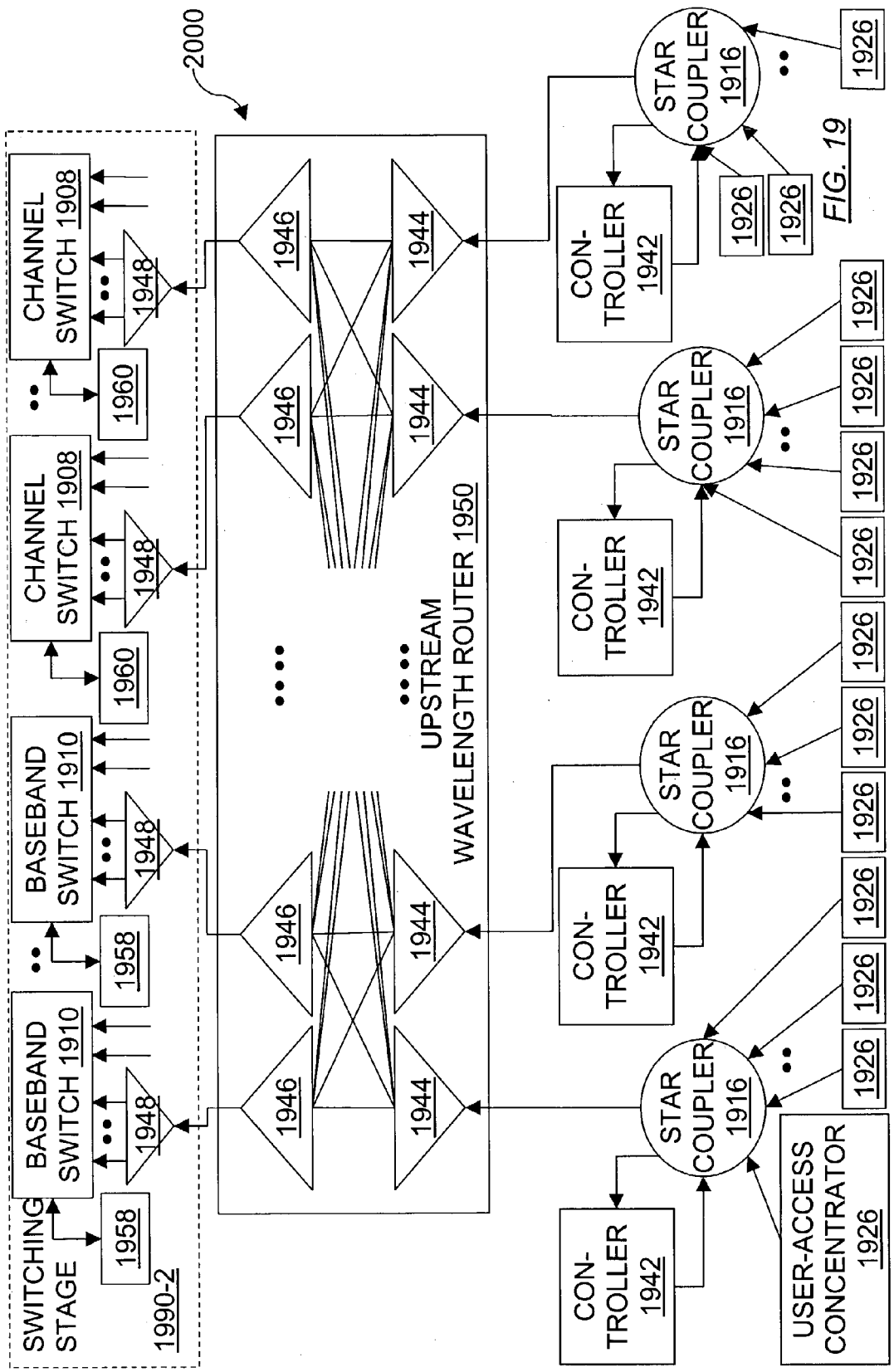
FIG. 19 illustrates the upstream side of a switching network comprising high-capacity baseband switches and high-capacity channel switches interconnecting fast optical switches, in accordance with an embodiment of the present invention.

An optical space switch 1204, as illustrated in FIG. 12, is made up of two sides, where each side is represented by an optical space switch, namely an upstream optical space switch 1204U and a downstream optical space switch 1204D. The upstream optical space switch 1204U receives channels from multiple user access concentrators 1226, as were employed in FIG. 10 to receive traffic from multiple traffic sources and to organize the traffic for upstream presentation. The upstream optical space switch 1204U transmits all of the received channels to a multiplexer (MUX) 1228 whereat the channels are combined into a wavelength division multiplex (WDM) link to an upstream wavelength router (not shown). A wavelength router is an optical device, well-known to those skilled in the art, which has a set of WDM input ports and a set of WDM output ports, and which connects each wavelength channel on an input port to a corresponding output port. The connection pattern is static; typically based on a cyclic mapping of input wavelength to output port number. (An embodiment of a wavelength router 2050 is shown in FIG. 19, and is described in the text accompanying that figure.) The downstream optical space switch 1204D receives channels from a downstream wavelength router (not shown) in a WDM link. The channels carried by the WDM link are separated out by a demultiplexer (DEMUX) 1230 before the channels are received by the downstream optical space switch 1204D. Once received, the channels are switched by the downstream optical space switch 1204D to respective user-access concentrators 1226. The operation of the upstream optical space switch 1204U and the downstream optical space switch 1204D is coordinated by a mutual space switch controller 1222. At the user-access concentrators 1226, the received signals are sent to their respective traffic sinks.

Figure 13:
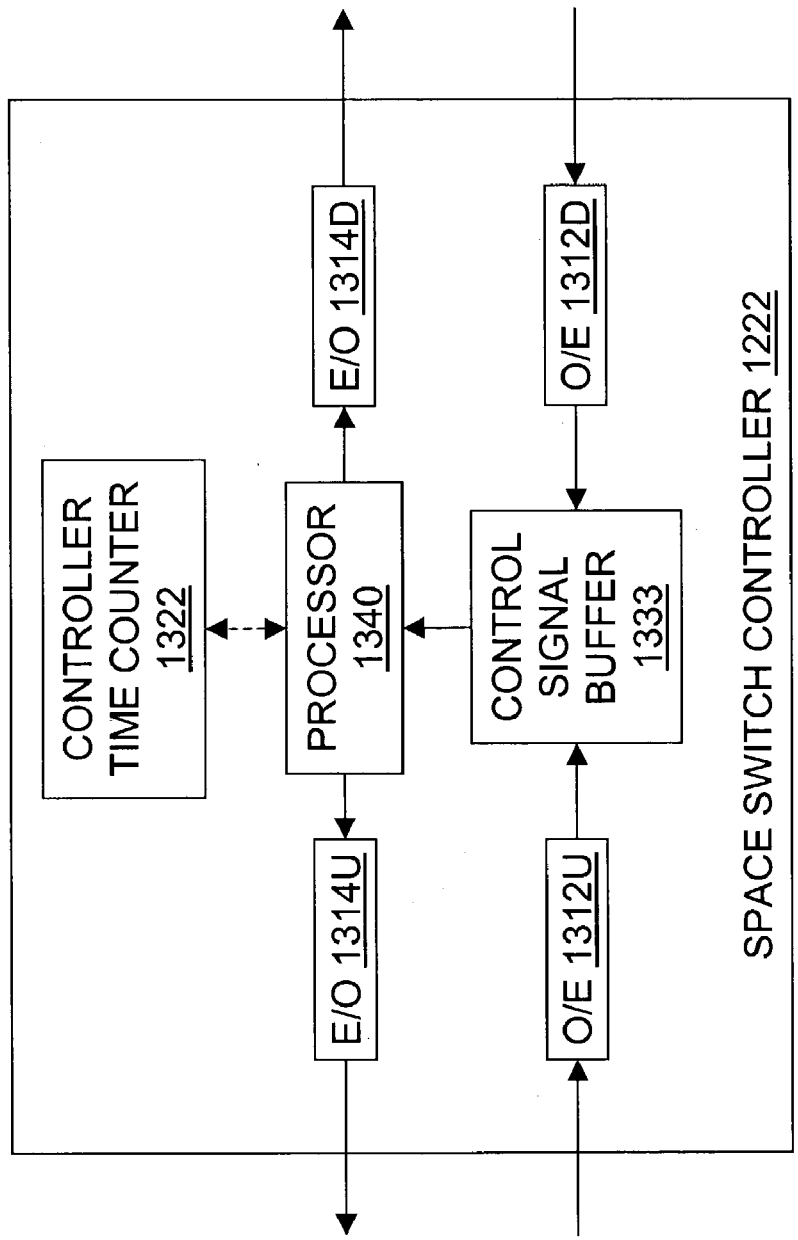
FIG. 13 illustrates the structure of an exemplary space switch controller of FIG. 10 according to an embodiment of the present invention.

An exemplary structure of the mutual space switch controller 1222 of FIG. 12 is illustrated in FIG. 13. Incoming control signals received from the upstream optical space switch 1204U are converted from optical to electrical signals at an upstream optical to electrical converter 1312U and passed to a control signal buffer 1333. Similarly, incoming control signals received from the downstream optical space switch 1204D are converted from optical to electrical signals at a downstream optical to electrical converter 1312D and passed to the control-signal buffer 1333. The control-signal buffer 1333 may comprise two separate memory devices to enable simultaneous writing. A processor 1340 receives the incoming control signals from the control signal buffer 1333 and formulates outgoing control signals for the space switches. Outgoing control signals may either be converted from electrical to optical signals at an upstream electrical to optical converter 1314U and passed to the upstream optical space switch 1204U or be converted from electrical to optical signals at a downstream electrical to optical converter 1314D and passed to the downstream optical space switch 1204D. Where the control signals are related to time-locking, it may be required that the processor 1340 communicate with a controller time counter 1322 to determine a controller time counter reading.

Figure 14:
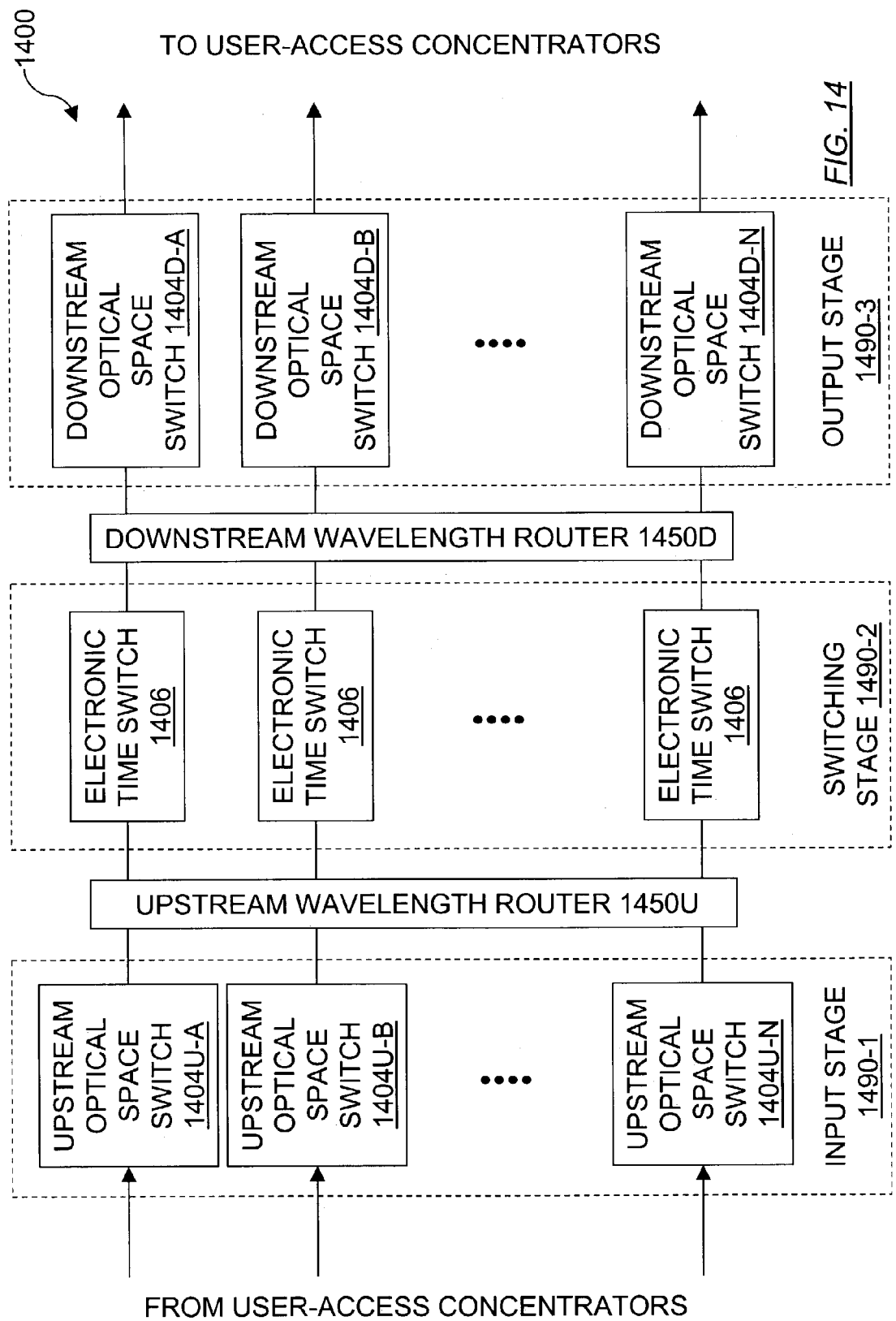
FIG. 14 illustrates a distributed space-time-space switch according to an embodiment of the present invention.

The sides of the optical space switch 1204 of FIG. 12 are logically separated for presentation in FIG. 14 as components of a distributed space-time-space switch 1400. The distributed space-time-space switch 1400 has an input stage 1490-1, which includes multiple upstream optical space switches 1404U-A, 1404U-B, 1404U-N, a switching stage 1490-2, which features multiple electronic time switches 1406, and an output stage 1490-3, including multiple downstream optical space switches 1404D-A, 1404D-B, ..., 1404D-N. Between the input stage 1490-1 and the switching stage 1490-2 is an upstream wavelength router 1450U. Similarly, a downstream wavelength router 1450D may be placed between the switching stage 1490-2 and the output stage 1490-3.

It is important to note that the links that connect the wavelength routers 1450U, 1450D to the various stages 1490-1, 1490-2, 1490-3 carry multiple channels and that the channels of a link outgoing from a wavelength router 1450U, 1450D are not necessarily the same as the channels of a link incoming to the wavelength router 1450U, 1450D.

Advantageously, the electronic time switches 1406 include optical to electrical conversion capability at input and electrical to optical conversion capability at output. Furthermore, the electronic time switches 1406 include buffers (memory) to enable incoming signals to be transmitted to the output stage 1490-3 at required time instants. As such, there is no need for the hereinbefore-mentioned time-locking (required in a geographically distributed switch) between upstream optical space switches 1404U in the input stage 1490-1 and the electronic time switches 1406 in the switching stage 1490-2. The electronic time switches 1406 are time-locked to the downstream optical space switches 1404D and the sources of traffic arriving at the input stage 1490-1 are time-locked to the upstream optical space switches 1404U.

As may be apparent to a person skilled in the art, the upstream space switches and downstream space switches with corresponding matching suffix (e.g., 1404U-A and 1404D-A) are considered to be part of a whole, namely an optical space switch, an exemplary one of which is illustrated in FIG. 12 to include the mutual space switch controller 1222. Furthermore, the upstream wavelength router 1450U and the downstream wavelength router 1450D are also considered to be part of a whole, namely a dual wavelength router 1450 (see FIG. 15).

Figure 15:
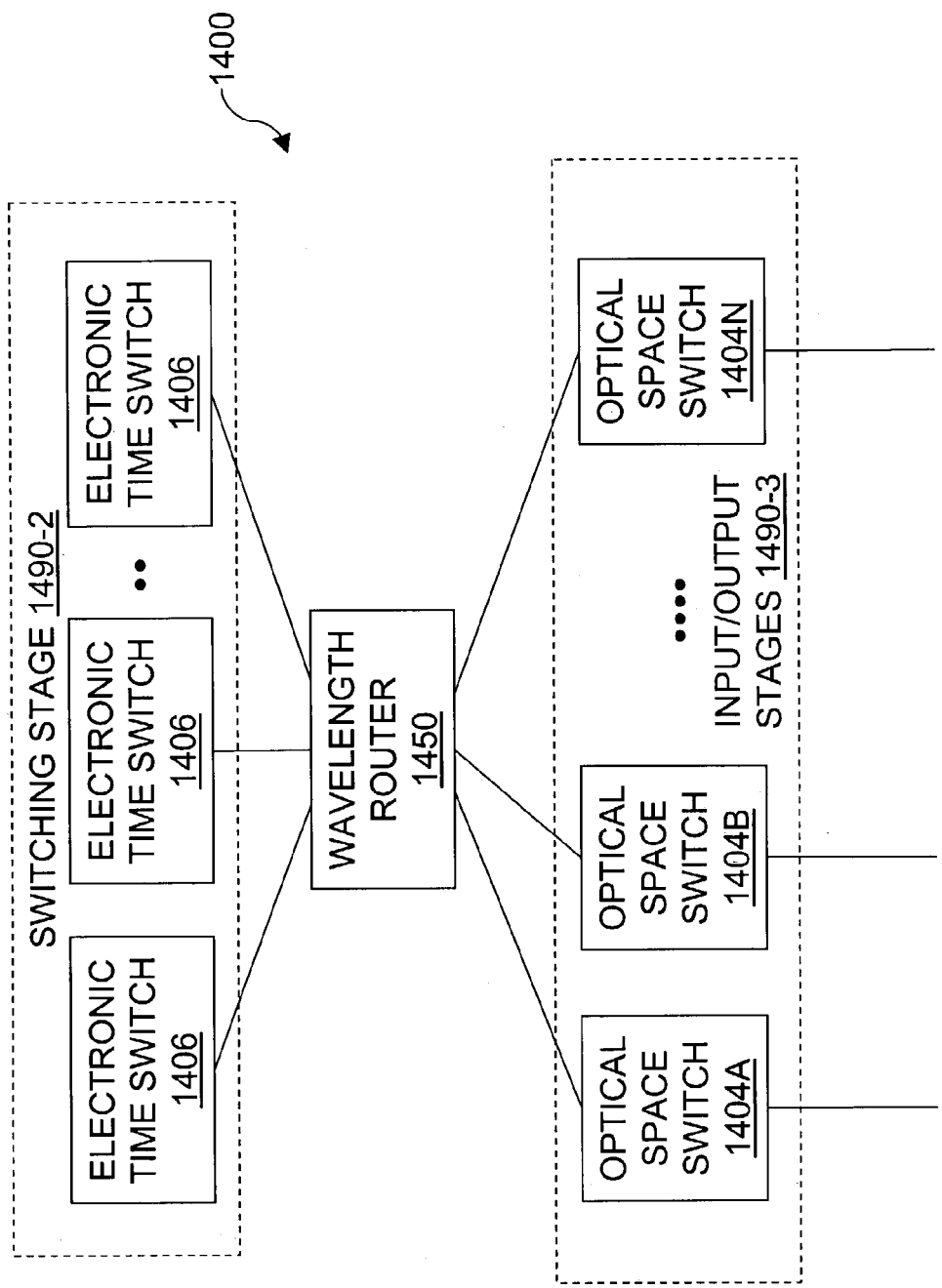
FIG. 15 illustrates an alternative arrangement of the distributed space-time-space switch of FIG. 14 according to an embodiment of the present invention.

The distributed space-time-space switch 1400 is illustrated in an alternative, "folded", arrangement in FIG. 15. The "folded" arrangement of FIG. 15 takes into account the "wholeness" of the elements of FIG. 14, thereby removing the logical separation of stages within the optical space switches and the wavelength router. The distributed space-time-space switch 1400 is illustrated in FIG. 15 to include multiple optical space switches 1404A, 1404B, ..., 1404N which connect to multiple electronic time switches 1406 via a dual wavelength router 1450. It will be understood that dual wavelength router 1450 includes both the upstream wavelength router 1450U and the downstream wavelength router 1450D of FIG. 14. Additionally, each of the optical space switch 1404A, 1404B, ..., 1404N includes an upstream optical space switch and a downstream optical space switch. For example, the optical space switch 1404B of FIG. 15 is understood to contain the upstream optical space switch 1404U-B and the downstream optical space switch 1404D-B of FIG. 14. Further, the connections between the wavelength router 1450 and the other elements of FIG. 15 are understood to include dual channels carrying signals in two directions, i.e., to the wavelength router 1450 and away from the wavelength router 1450.

Figure 16:
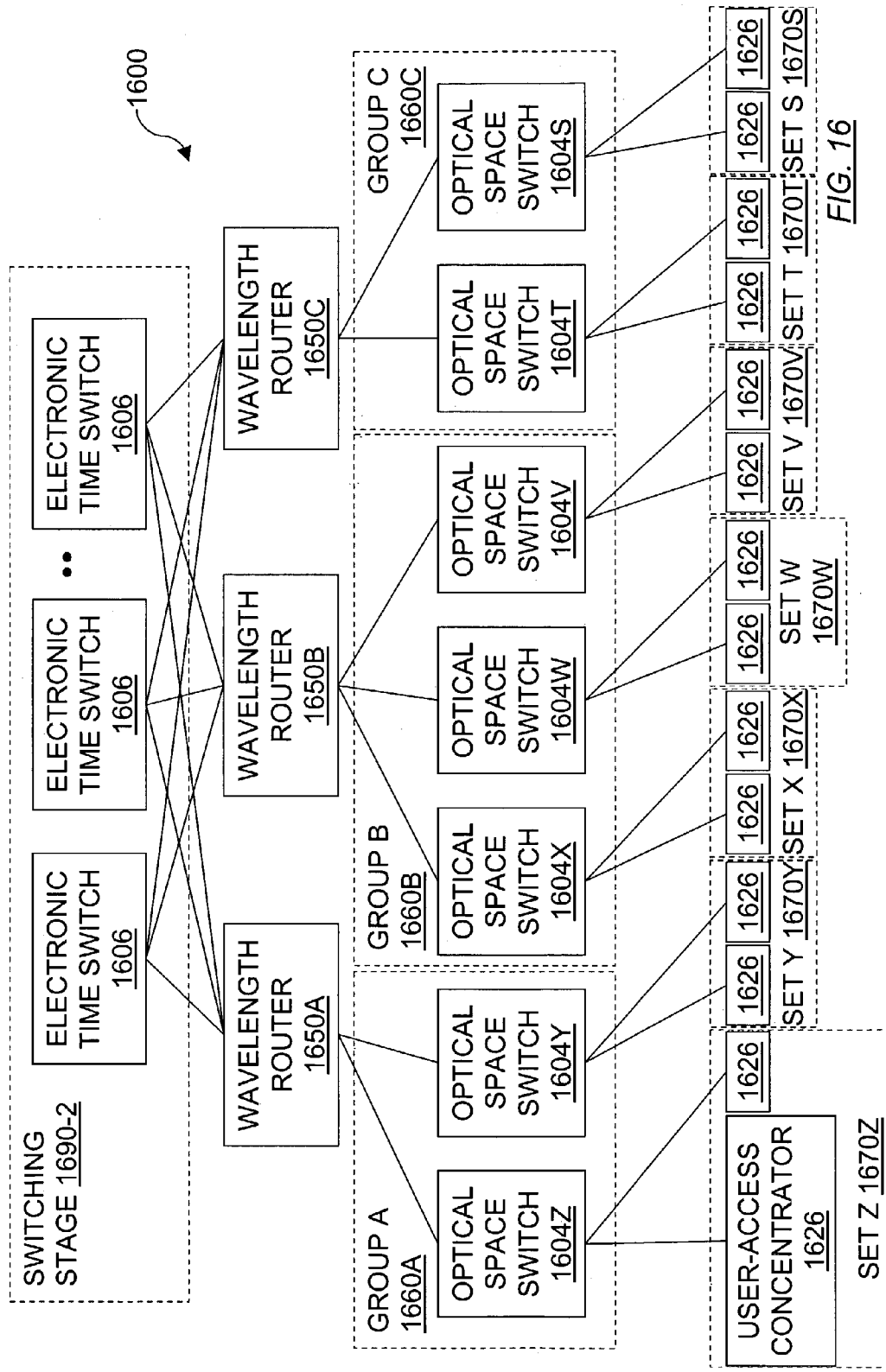
FIG. 16 illustrates a switching network based on the distributed space-time-space switch of FIG. 15 according to an embodiment of the present invention.

In FIG. 16, the structure of the distributed space-time-space switch 1400 of FIG. 15 is extended to provide a switching network 1600. The traffic that is switched by the switching network 1600 illustrated in FIG. 16 is provided by traffic sources and sinks (not shown) that are connected to a number of user-access concentrators 1626. The user-access concentrators 1626 are arranged in sets including a set S 1670S, a set T 1670T, a set V 1670V, a set W 1670W, a set X 1670X, a set Y 1670Y and a set Z 1670Z (individually or collectively 1670). Each of the sets 1670 is defined by the connection of all of the user-access concentrators 1626 in a given set 1670 to a given one of a number of available optical space switches 1604S, 1604T, 1604V, 1604W, 1604X, 1604Y, 1604Z (individually or collectively 1604). Each of the optical space switches 1604 is illustrated as belonging to one of three groups of optical space switches 1604, namely Group A 1660A, Group B 1660B and Group C 1660C (individually or collectively 1660). Each of the groups 1660 is defined by the connection of all of the optical space switches 1604 in a given group 1660 to a given one of available wavelength routers 1650A, 1650B, 1650C (individually or collectively 1650). Each wavelength router 1650 is connected to all available switches in a switching stage 1690-2. As illustrated in FIG. 16, the switching stage 1690-2 includes a number of electronic time switches 1606. As was the case with the electronic time switches 1406 of FIG. 14, the electronic time switches 1606 of FIG. 16 include optical to electrical conversion capability at input and electrical to optical conversion capability at output. A user-access concentrator 1626 can reach any other user-access concentrator through one of the optical space switches 1604. A user-access concentrator 1626 may, however, connect to two or more optical space switches 1604.

Note that each connection between the stages of FIG. 16 may consist of one or more optical fibers, each fiber carrying one or more wavelengths. It is also noted that a user-access concentrator may connect to more than one optical space switch.

Once a switching network design has been completed, as illustrated in FIG. 16, to provide a desired network geographic distribution and to support a desired traffic demand, an efficient design is advantageous for the optical space switches 1604. Advantageously, the hereinbefore-mentioned upstream optical space switches (for example 1404U of FIG. 14) may each be constructed according to an embodiment illustrated in FIG. 17, which illustrates a fast-switching optical space switch 1700 based around a star coupler 1716.

The star coupler 1716 has n+1 input ports and a single output port. Incoming optical signals (channels) received at the n+1 input ports are multiplexed by the star coupler 1716 and a multiplexed optical output signal is made available at the output port. One of the (n+1) input ports is reserved for receiving control signals as will be described below. Subsequently, after appropriate signal amplification by an amplifier 1718, the multiplexed optical output signal is demultiplexed by an output demultiplexer 1720. The output demultiplexer 1720 may be an Arrayed Waveguide Grating (AWG) device, an Echelle grating device, an array of thin-film filters, or other optical filters known to those skilled in the art, and may include one or more fiber Bragg gratings and/or waveguide Bragg gratings to de-interleave closely-spaced WDM channels. A space switch controller 1722 is provided to co-ordinate the operation of the sources of the incoming optical signals. The space switch controller 1722 receives a signaling channel output 1721 from the output demultiplexer 1720 and sends a signaling channel 1723 to the star coupler 1716 for multiplexing into the optical output signal. As such, the control may establish time-locking with subtending traffic sources and specify a switching schedule for TDM time frames to be sent from the traffic sources. The space-switch controller 1722 is electronics-based, hence an optical-electrical (O-E) interface 1726 and an electrical-optical (E-O) interface 1728 are provided as indicated in FIG. 17.

Figure 17:
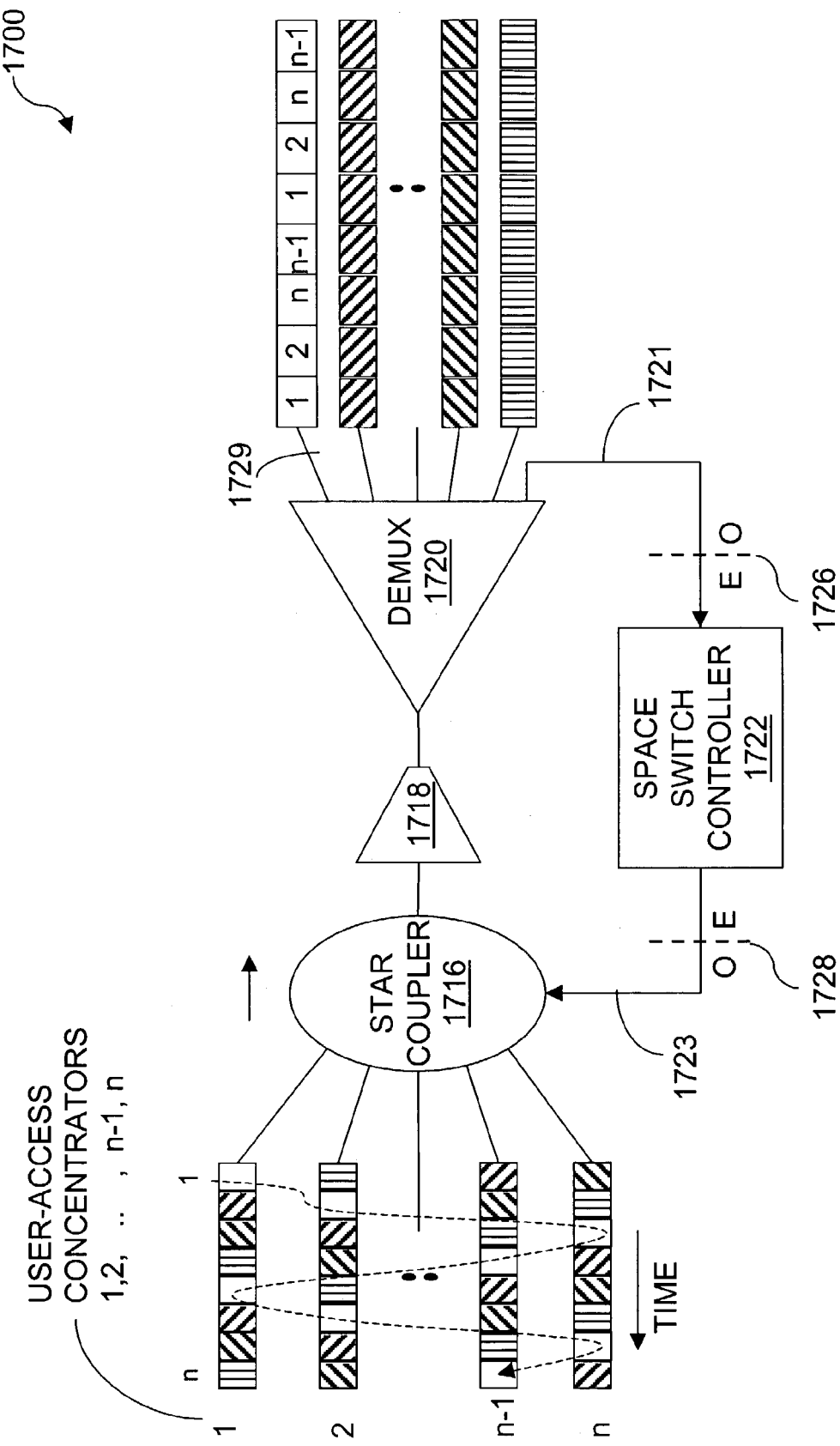
FIG. 17 illustrates a fast-switching optical switch based on a single star coupler where spatial switching is effected by tunable lasers provided at the traffic sources according to an embodiment of the present invention.

All connecting lines in FIG. 17 represent optical fibers or optical waveguides that can carry light. Light travels only from left to right in the figure, with the exception of connections to and from the space switch controller 1722 wherein light travels according to the directions of the respective arrows in FIG. 17.

FIG. 17 schematically shows four (of n≧4) incoming, time-division multiplexed (TDM), optical signals (channels) received from signal sources that are equipped with tunable lasers. The tunable lasers together with the star coupler 1716, the amplifier 1718, and the demultiplexer 1720 constitute a space switch. According to a TDM scheme proposed herein, the incoming optical signals include payload signals confined to time slots within a TDM time frame. Each payload signal modulates an optical carrier of a distinct wavelength, where the wavelength of the carrier is selected according to the destination of the payload signal. Thus, the wavelength of the carrier on a given channel may change multiple times during a TDM time frame. Through pre-arranged time-locking, the n payload optical signals incoming to the optical space switch from n user-access concentrators arrive at the n input ports in time-alignment. Additionally, through pre-arranged scheduling, none of the carriers received in a given time slot overlaps spectrally with any other of the carriers in the given time slot. A signal source (traffic source) may use more than one time slot per time frame to transmit to any sink.

The n incoming payload signals are combined into one multiplexed optical output signal by the star coupler 1716. The output demultiplexer 1720 is configured to divide out the constituent wavelength bands received in the multiplexed optical output signal. Thus, the payload signals that modulate carriers of the same wavelength that arrive at any of the input ports of the star coupler 1716 are directed to a respective output port of the output demultiplexer 1720. For example, output channel 1729 carries time-slotted signals received from input channels 1, 2, n−1, and n during the time slots indicated. As discussed hereinbefore, the incoming optical signal received at an input port of the star coupler 1716 may originate at a user-access concentrator having a tunable laser (see FIG. 11). Thus, the tunable laser may be employed to select the wavelength band containing a payload signal based on the destination of the payload signal. The arrangement of FIG. 17 functions as a space switch only when associated with tunable signal sources such as user-access concentrators equipped with tunable lasers.

It may be desirable that the wavelength demultiplexer be remotely located. In such a case, the output of the star coupler 1716 or the output of amplifier 1718 may split into a payload beam and a control beam by means of an optical power splitter (not illustrated). The control beam is directed to a wavelength filter (not illustrated) to extract the control channel then to the O-E interface 1726. Advantageously, the function of the optical power splitter and wavelength filter may be combined into a single filter element. Alternatively, another star-coupler output port would be provided and its output optical signal is directed to a wavelength filter to extract the control channel then to the O-E interface 1726.

Each user-access controller is designated a time-slot in a slotted time frame to transmit control signals. The number of time slots per slotted time frame must equal or exceed the number of user access concentrators connecting to a star coupler. Each user-access concentrator is time locked to its star coupler and during its designated control time slot it modulates a carrier to produce a wavelength band corresponding to the controller of the star coupler. In an alternative method of communicating control signals, the user-access concentrator may transmit continuous payload data during all time slots at wavelength bands corresponding to respective connections and shifts its output wavelength band to one designated to the star coupler's controller only when it needs to communicate with the controller. The shift from a payload connection to a control connection may occur at the termination of a current connection, or may intentionally interrupt a connection in order to communicate with the controller. An idle user-access concentrator can, at its designated control time slot, communicate with the star coupler's controller by tuning its laser to the corresponding wavelength.

Figure 18A:
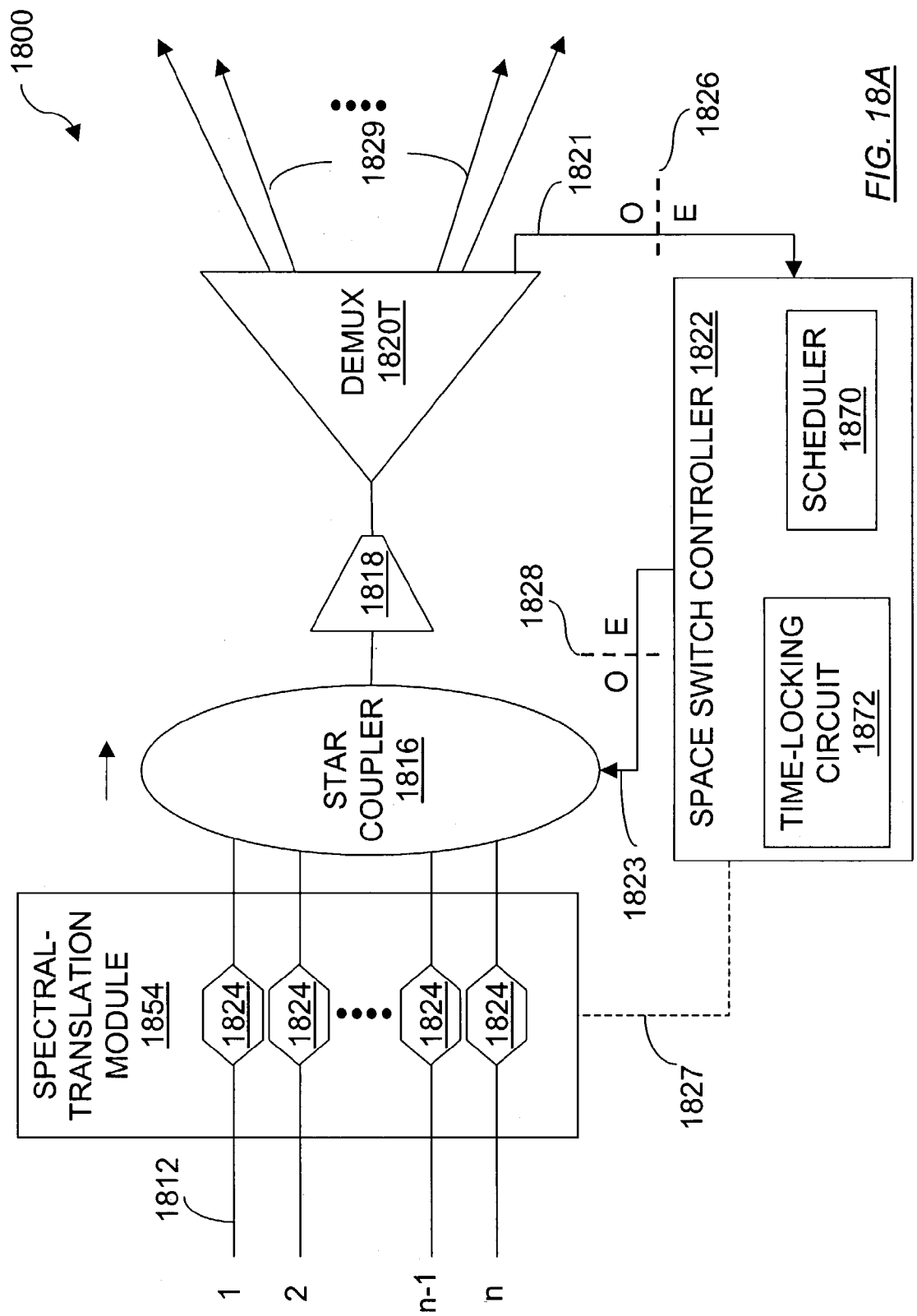
FIG. 18A illustrates a fast-switching optical switch based on a single star coupler where spatial switching is effected using wavelength converters according to an embodiment of the present invention.

As described above, the arrangement of FIG. 17, which is based on tunable lasers at source, constitutes an upstream space switch. An upstream space switch may also be based on the arrangement of FIG. 18A, where wavelength converters replace tunable lasers. When the arrangement of FIG. 18A is used as an upstream space switch, each user-access concentrator subtending to the space switch multiplexes signals from data sources into a slotted time frame and the multiplexed signal modulates an optical carrier. At the space switch, wavelength conversion is applied during individual time slots by a corresponding wavelength converter 1824 in the spectral-translation module 1854. A downstream space switch may be constructed as illustrated in FIG. 18B described below.

FIG. 18A illustrates an optical space switch 1800 that is quite similar to the optical space switch 1700 of FIG. 17 which is based on tunable sources. Like the optical space switch 1700 of FIG. 17, the optical space switch 1800 of FIG. 18A includes a star coupler 1816 whose output is amplified by an amplifier 1818 and passed to an output demultiplexer 1820T, which may be an AWG device. A wavelength converter 1824 is provided for each input channel 1812, organized within a spectral-translation module 1854.

Figure 18B:
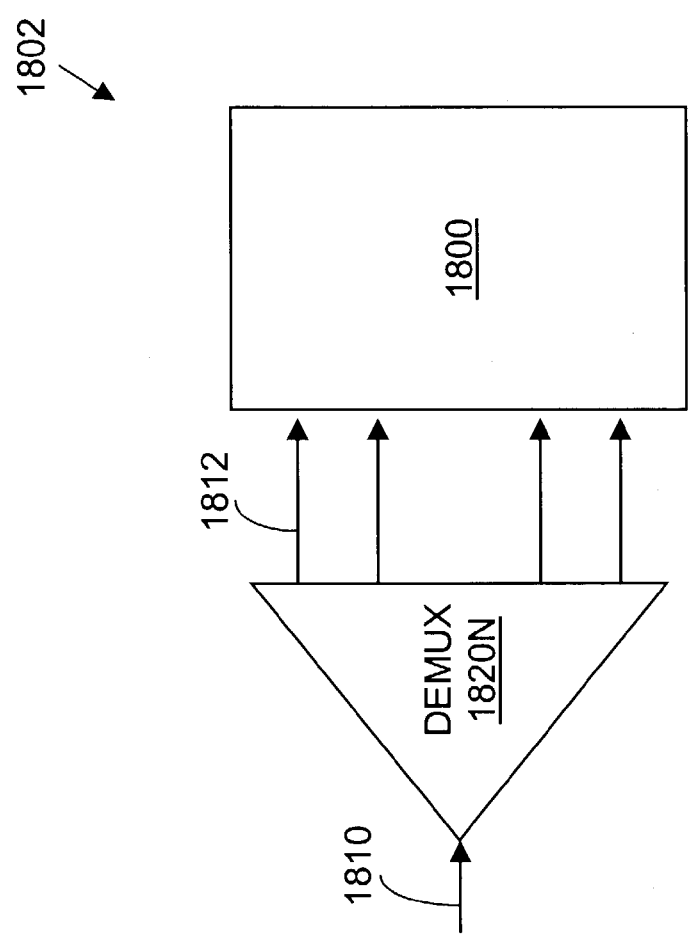
FIG. 18B illustrates the switch of FIG. 18A preceded by a wavelength demultiplexer for use with an embodiment of the present invention.

An optical space switch 1802, illustrated in FIG. 18B, includes an input demultiplexer 1820N at the input. The input demultiplexer 1820N receives a WDM signal comprising a number of channels, not exceeding the number, m, of output ports of the output demultiplexer 1820T, and each channel carries a time slotted optical signal with the payload signal in each time slot destined to a designated one of the output ports of the output demultiplexer 1820T. The input demultiplexer 1820N may be an AWG device, an Echelle grating device, an array of thin-film filters, or other optical filters known to those skilled in the art, and may include one or more fiber Bragg gratings and/or waveguide Bragg gratings to de-interleave closely-spaced WDM channels. The input demultiplexer 1820N divides the WDM signal into component channels so that the channels output from the input demultiplexer 1820N may be passed through a wavelength converter 1824 before being presented to the input ports of the star coupler 1816. Each channel output from the input demultiplexer 1820N constitutes an input channel 1812.

A space switch controller 1822 is provided to co-ordinate the operation of the sources of the channels and the wavelength converters 1824. The space switch controller 1822 receives a signaling channel output from the demultiplexer 1820 and sends a signaling channel to the star coupler 1816 for multiplexing into the optical output signal. The space switch controller 1822 also sends control signals to the wavelength converters 1824. Advantageously, when the optical space switch is constructed according to the embodiment illustrated in FIG. 18A, user-access concentrators, or other traffic sources, may transmit distinct payload signals in distinct time slots using the same wavelength band instead of employing tunable lasers.

If the demultiplexer 1820T is collocated with the star coupler, an output channel 1821 of the demultiplexer 1820T carries multiplexed control signals received from the input ports of the star coupler 1816 and directs the control signals to the space switch controller 1822 through the O-E interface 1826. The output of the space switch controller 1822 is directed to an input port of star coupler 1816 through the E-O interface 1828 and the input channel 1823 to be distributed to the output channels 1829. The space switch controller also determines the required wavelength-band shift of each of the wavelength converters 1824 of the spectral translation module 1854. The demultiplexer 1820T may be remotely located and the space-switch controller 1822 may then receive its input control channel through beam splitting into a payload beam and a control beam at the star-couplers output or at the output of amplifier 1818 as described above with reference to FIG. 17. The control beam would be processed by a wavelength filter (not illustrated) to extract the control channel which is then connected to the O-E interface 1826. Alternatively, an additional output port of the star coupler 1818 would be provided and its optical output would be provided to a wavelength filter (not illustrated) to extract the control channel which is then connected to the O-E interface 1826.

In the optical space switch 1800, in order to enable a payload signal in a given time slot on any channel to be switched to its designated output port, the payload signal may have to be frequency shifted (wavelength shifted) to the spectral band corresponding to the designated output port. In other words, spatial switching is realized by frequency-band (wavelength-band) shifting.

In order to enable time-slot switching in the optical space switches 1700, 1800 of FIGS. 17 and 18, each user-access concentrator must be time-locked to the optical space switch, as described hereinbefore. Furthermore, scheduling of the transmission of signals destined to each output port of the output demultiplexer is required to ensure that the payload signals received at the n input ports during any given time slot are destined to different output ports of the output demultiplexer.

The space switch controller 1822 of the optical space switch 1800 of FIG. 18A receives control signals from an output port of the output demultiplexer 1820T. Any control signals sent by the user-access concentrators may be scheduled to arrive at the optical space switch 1800 in staggered time slots. The space switch controller 1822 comprises a time-locking circuit 1872 and a scheduler 1870, among other circuitry, familiar from the mutual space switch controller 1222 of FIG. 13. The scheduler 1870 computes a switching schedule for each of the user-access concentrators and may communicate the switching schedule to each user-access concentrator through control signals sent on a downstream channel during a designated time slot.

In an alternative embodiment, control signals are sent at arbitrary times by the user-access concentrators. The space switch controller 1822 uses a downstream channel to acknowledge back to the user-access concentrators those signals that are received successfully. If a user-access concentrator does not receive an acknowledgement from the space switch controller 1822, then the user-access concentrator retransmits the non-acknowledged control signal. A user-access concentrator may not receive an acknowledgement from the space switch controller 1822, for instance, if another user-access concentrator sends control signals to the space switch controller 1822 at the same time. Neither of the control signals would be understood by the space switch controller 1822 and, for this reason, no acknowledgement would be sent.

Figure 20:
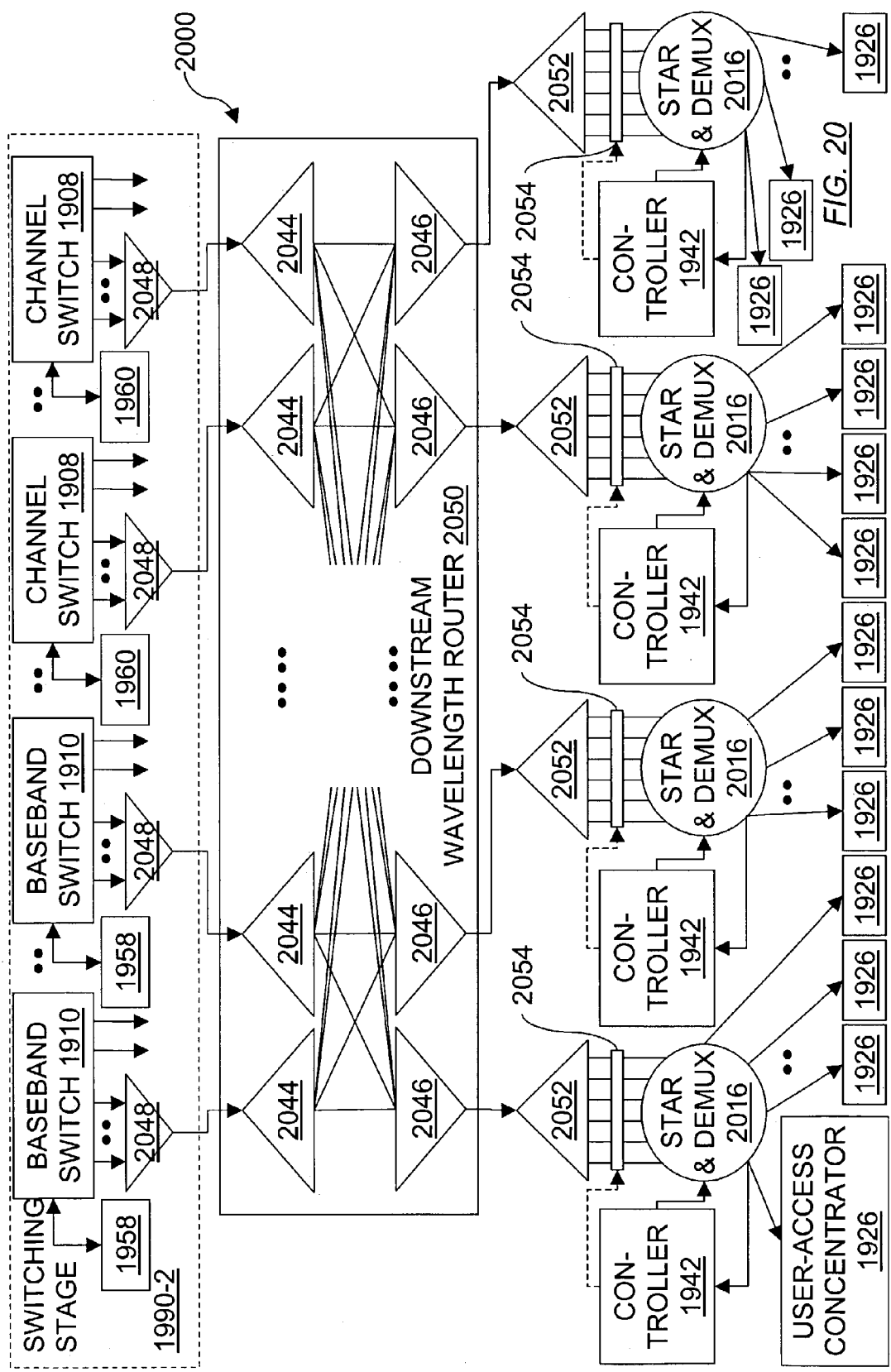
FIG. 20 illustrates the downstream side of a switching network comprising high-capacity baseband switches and high-capacity channel switches interconnecting fast optical switches, in accordance with an embodiment of the present invention.

FIGS. 19 and 20 illustrate sides of a switching network based, to some extent, on the switching network 1600 of FIG. 16. Where the switching stage 1690-2 of the switching network 1600 of FIG. 16 features the electronic time switches 1606, a switching stage 1990-2 of the switching network of FIGS. 19 and 20 includes baseband switches 1910 (which are electronic time switches) and channel switches 1908 in a manner similar to that illustrated in FIG. 5. Additionally, the input and output stages make use of the optical space switch design concepts presented in FIGS. 17 and 18.

As was the case with the electronic time switches 1406, 1606 of FIGS. 14 and 16, the baseband switches 1910 of FIGS. 19 and 20 include optical to electrical conversion capability at input and electrical to optical conversion capability at output.

FIG. 19 illustrates an upstream side 1900 of the switching network. User-access concentrators 1926 receive traffic from subtending traffic sources and transmit traffic to subtending traffic sinks. A traffic source is often paired with a traffic sink in a single unit. A user-access concentrator 1926 may be equipped with a tunable laser to select the wavelength of the carrier signal. Alternatively, a user-access concentrator 1926 may transmit its traffic to a star coupler 1916 over a single wavelength channel which may undergo wavelength conversion at the input of the star coupler. The user-access concentrators 1926 are arranged into four sets. The user-access concentrators of each set are associated with a star coupler 1916, which acts as an upstream optical space switch of the type described with reference to FIG. 17 or FIG. 18A. However, the demultiplexer 1944, corresponding to demultiplexer 1720 of the stand-alone switch 1700 of FIG. 17, or demultiplexer 1820 of stand-alone switch 1800 of FIG. 18A, may not be collocated with the star coupler 1916 and, therefore, the controller 1942 (corresponding to controller 1722 of space switch 1700 of FIG. 17 or controller 1822 of space switch 1800 of FIG. 18A), receives its input through an additional output port of star coupler 1916, a wavelength filter (not illustrated) to extract a control channel, and an O-E interface (not illustrated) corresponding to O-E interface 1726 of FIG. 17 or O-E interface 1826 of FIG. 18A. A controller 1942 directs its output to an input port of the star coupler 1916 through an E-O interface (not illustrated in FIG. 19) corresponding to E-O interface 1728 of space switch 1700 or E-O interface 1828 of space switch 1800. Each star coupler 1916 is associated with a corresponding mutual space-switch controller 1942. As will be described below, the mutual space-switch controller 1942 controls an upstream side and a downstream side of a dual star-coupler-based space switch.

It is noted that a user-access concentrator 1926 may connect to more than one star coupler 1916 and each user-access concentrator 1926 must be time-locked to each star coupler 1916 to which it is connected. The time-locking acquisition process when tunable lasers are used at a user-access concentrator 1926 to effect spatial switching at a corresponding star coupler 1916 differs slightly from the time-locking acquisition process when spatial switching is realized by wavelength conversion at the input of the corresponding star coupler 1916. Further details of the time-locking process are not provided in the present disclosure.

A user-access concentrator 1926 supports a number of traffic sources and traffic sinks. The total-access capacity may exceed the capacity of the link connecting the user-access concentrator to a star coupler. At any instant of time, the combined data-rate from all traffic sources can not exceed the capacity of the link to the star coupler. A user access concentrator may handle digital data or analog signals. A digital user access concentrator is described with reference to FIG. 11. Details of an analog user-access concentrator are not provided in this disclosure.

Each star coupler 1916 provides a multiplexed output signal to an upstream wavelength router 1950. The upstream wavelength router 1950 includes an array of upstream demultiplexers 1944 and an array of upstream multiplexers 1946. In one implementation, each of the upstream demultiplexers 1944 and each of the upstream multiplexers 1946 is an Arrayed Waveguide Grating device. Output signals from the upstream wavelength router 1950 are sent over WDM links towards the switches in the switching stage 1990-2. Devices (not shown) that manipulate the quality of the optical signal, such as optical amplifiers, and/or optical dispersion compensators, may be included between stages or within stages of the switching network of FIGS. 19 and 20 where necessary to increase the spatial reach and the signal quality of the switching network. Performance monitoring devices (not shown) may additionally be included.

The switching stage 1990-2 includes the baseband switches 1910 and the channel switches 1908. Each of the switches in the switching stage 1990-2 is associated with a demultiplexer 1948. Additionally, each of the baseband switches 1910 is associated with a baseband switch controller 1958 and, similarly, each of the channel switches 1908 is associated with a channel switch controller 1960.

A baseband switch 1910 is electronics based and has an O-E interface at input. Control signals can then be identified and directed to a corresponding controller 1958. A channel switch 1908 may also be an electronic space switch having an O-E interface at input and, hence, control signals can be identified and directed to a corresponding controller 1960. If the channel switch 1908 is a photonic switch, control signals are preferably spectrally separated from the payload signals. A wavelength band may then include both a narrow-band control channel and a payload channel. Details of the spectral separation of control and payload are not provided in this disclosure.

A downstream side 2000 of the switching network under consideration is illustrated in FIG. 20. The switching stage 1990-2 as illustrated in FIG. 19 is reproduced with an additional element associated with each of the switches in the switching stage 1990-2. The additional element is a multiplexer 2048. The baseband switches 1910 and the channel switches 1908 have output ports (not shown) on their respective downstream sides. Such output ports include a set of optical transmitters (not shown); generally each of such optical transmitters operates at a fixed wavelength. Multiplexed output signals from the switching stage 1990-2 are sent over WDM links to a downstream wavelength router 2050. For simplicity of illustration, the demultiplexers 1948 present in the switching stage 1990-2 in FIG. 19 are omitted from the switching stage 1990-2 in FIG. 20.

The downstream wavelength router 2050 includes an array of downstream demultiplexers 2044 and an array of downstream multiplexers 2046. In one implementation, each of the downstream demultiplexers 2044 and each of the downstream multiplexers 2046 is an Arrayed Waveguide Grating device. However, other devices may be used as described earlier. Output signals from the downstream wavelength router 2050 are sent over WDM links towards downstream optical space switches.

Acting as the downstream optical space switches are interconnected elements as described with reference to FIG. 18B. An exemplary downstream optical space switch includes an input demultiplexer 2052, a spectral-translation module 2054 (understood to contain multiple wavelength converters as shown in the spectral-translation module 1854 of FIG. 18A), a star coupler and an output demultiplexer. The latter two elements are shown in a combination 2016 for simplicity of illustration. Associated with each downstream optical space switch is the mutual space switch controller 1942 mentioned earlier with reference to FIG. 19.

In operation, in view of FIG. 19, the user-access concentrators 1926 of each set send traffic to the associated star coupler 1916 with the wavelength of the carrier for each signal set based on control input from the corresponding mutual space switch controller 1942. Each star coupler 1916 receives input from, and provides output to, the corresponding mutual space switch controller 1942. Note that the output provided to the mutual space switch controller 1942 is a multiplex of all of the inputs to the star coupler 1916, since a demultiplexer is not provided to divide out a control channel from the output of the star coupler 1916. Beneficially, an optical filter may be provided within the input side of the mutual space switch controller 1942, such optical filter being static, such that the user-access concentrators 1926 may send information to the mutual space switch controller 1942 on a reserved wavelength. Alternatively, an optical filter may be provided within the input side of the mutual space switch controller 1942, such optical filter being tunable according to a schedule, such that the user-access concentrators 1926 may send information to the mutual space switch controller 1942 on a wavelength that is associated with a reserved time-slot for a particular user-access concentrator 1926.

The multiplexed output signal of each star coupler 1916 is provided to one of the upstream demultiplexers 1944 of the upstream wavelength router 1950. The upstream demultiplexer 1944 receives the multiplexed output signal from the corresponding star coupler 1916 and divides the multiplexed output signal into component channels. According to a predetermined configuration, each channel at the output of a given upstream demultiplexer 1944 is sent to a particular upstream multiplexer 1946. The channels that are received by each of the upstream multiplexers 1946 are multiplexed into an output signal that is then sent over a WDM link towards one of the switches in the switching stage 1990-2.

The signal received in the switching stage 1990-2 over the WDM link is demultiplexed by the demultiplexer 1948 into component channels. A component channel may either be presented to a channel switch 1908 for switching to a downstream channel, or a baseband switch 1910 for switching to at least one of the downstream channels during successive time slots of a predefined time frame.

Outbound output channels are illustrated in FIG. 20 being received by the switch-based multiplexer 2048 and multiplexed into an output signal sent over a WDM link to the downstream wavelength router 2050. At the downstream wavelength router 2050, the signal is received by one of the downstream demultiplexers 2044 and divided into component channels. According to a predetermined configuration, each channel at the output of a given downstream demultiplexer 2044 is sent to a particular downstream multiplexer 2046. The channels that are received by each of the downstream multiplexers 2046 are multiplexed into an output signal that is then sent over a WDM link towards one of the downstream optical space switches. Thus, output signals from the switching stage 1990-2 are statically routed by the downstream wavelength router 2050 to respective WDM links towards downstream optical space switches, the routing being pre-determined according to the fixed wavelength assigned to each output port of the switching stage 1990-2.

At the downstream optical space switch that receives the signal, the signal is demultiplexed into component channels by the input demultiplexer 2052. Each component channel is passed to a corresponding wavelength converter in the spectral-translation module 2054. Under control of the mutual space switch controller 1942, and based on the destination user-access concentrator 1926 of the component channels, the wavelength converters may shift the wavelength bands of the incoming component channels during successive time slots. The wavelength-shifted component channels are then multiplexed by the star coupler of the combination 2016 and then demultiplexed by the demultiplexer of the combination 2016 and sent to respective destination user-access concentrators 1926.

In consideration of switching a particular flow of traffic that is available to be time-switched, pre-arrangements must be made. Such pre-arrangements are said to set up a time-switched path. Initially, a given user-access concentrator 1926 receives an indication of an amount and a destination of the particular flow of traffic to be switched through the switching network of FIGS. 19 and 20. The given user-access concentrator 1926 sends a connection request to the mutual space switch controller 1942 of the optical space switch that is designated to service the set of user-access controllers of which the given user-access concentrator 1926 is a part. With the knowledge of the destination that the user-access concentrator 1926 gained from the connection request, the mutual space switch controller 1942 of the optical space switch may consult a route set to select a preferred switch of the switching stage 1990-2 for switching the particular flow of traffic toward the destination user-access controller. Based on the switch selected from the switching stage 1990-2, the mutual space switch controller 1942 of the optical space switch may devise a switching schedule.

A given user access concentrator 1926 may be connected to more than one star coupler 1916 and/or more than one combination star coupler and demultiplexer 2016 so as to provide more than one access path to the network of FIGS. 19 and 20.

A route set may be defined for each directional pair of optical space switches. The route set is directional in the sense that the routes from a second optical space switch to a first optical space switch are not necessarily derived by reversing the routes from the first optical space switch to the second optical space switch. The routes in a route set are pre-calculated and updated only when new optical space switches are installed or new switches are installed in the switching stage 1990-2. When an optical space switch or a switch in the switching stage 1990-2 is temporarily unavailable, only routes that are affected by the unavailability are marked as temporarily unavailable and other routes in respective route sets are used.

In one method of routing, each mutual space switch controller 1942 stores an ordered list of preferred switches in the switching stage 1990-2 for switching towards each destination optical space switch.

The routing function in a telecommunications network can be adapted to allocate the shortest path for each connection. However, under spatial traffic imbalance, shortest routes for some pairs of optical space switches can be overloaded, and a path through a different switch in the switching stage 1990-2 may be selected. The routing function in the network of FIG. 19 and FIG. 20 can be simplified if the mutual space switch controller 1942 of each optical space switch stores a route set to each other optical space switch. A route merit can be determined as a function of the propagation delay along the route. A route description in the network of FIG. 19 and FIG. 20 would require a record of less than 8 bytes. A route set that contains as many as 32 routes, for example, would consume storage of 256 bytes. In a high-capacity wide-coverage network having 10,000 optical space switches, each having an access capacity of the order of 320 Gigabits per second for example, each upstream optical space switch would have to store 9,999 route sets, requiring about 2.5 megabytes of memory. Thus, even in a network having a capacity of 3.2 petabits-per-second (10,000 optical space switches, each having an access capacity in the order of 0.32 Tb/s), the required storage of route-set information would be reasonable.

As an alternative to selecting from a route set, the mutual space switch controller 1942 of the optical space switch may poll the controllers 1958, 1960 of the switching stage 1990-2 for availability of sufficient free capacity in a route toward the destination user-access controller. Based on the availability reported by the controllers 1958, 1960 of the switching stage 1990-2, the mutual space switch controller 1942 of the optical space switch may devise a switching schedule.

Connection Setup Example

The connection setup process described above with reference to FIG. 19 and FIG. 20 is further illustrated by means of an example. Consider, for example, a request from a user-access concentrator 1926X to switch data requiring two time slots per time frame to user-access concentrator 1926Y. The user-access concentrators 1926X is connected to star couplers 1916X and 2016X which have a mutual controller 1942X. The user-access concentrators 1926Y is connected to star couplers 1916Y and 2016Y which have a mutual controller 1942Y. The request is handled by controller 1942X which attempts to find a route through one of the baseband switches 1910. If successful, controller 1942X allocates the two time slots to be switched at a selected one of the baseband switches 1910. At the upstream demultiplexer 1944 associated with the mutual space switch controller 1942X, a particular wavelength is associated with the upstream multiplexer 1946 that connects over a WDM link to the selected one of the baseband switches 1910. When informing the concentrator controller of user-access concentrator 1926X of the switching schedule, the mutual space switch controller 1942X indicates a particular wavelength for the two time slots as well as a place within the time frame for each of the time slots.

The mutual space switch controller 1942X also provides the switching schedule to the controller 1958 of the selected baseband switch 1910. The controller 1958 of the selected baseband switch 1910 can then pass an indication of the switching of the two time slots to the mutual space switch controller 1942Y of a downstream optical space switch 2016Y whose concentrator set includes a user-access concentrator 1926Y with access to the traffic destination. The mutual space switch controller 1942Y of the downstream optical space switch 2016Y can then specify to the controller 1958 of the selected baseband switch 1910 the timing of the two time slots within a time frame transferred between the two switches.

According to the switching schedule provided, the concentrator controller 1140 (see FIG. 11) directs the incoming buffer 1133 to release data from a particular data stream, during each designated time slot, to the modulator 1135 and directs the tunable laser 1134 to set the carrier wavelength appropriately. Where the time slot of traffic produced is a given time slot to be sent to the selected baseband switch 1910, the signal corresponding to the given time slot is sent as part of the time frame sent over an access channel from the user-access concentrator 1926X to the star coupler 1916X of the upstream optical space switch.

The access channel from the user-access concentrator 1926X, including the given time slot, is multiplexed by the star coupler 1916X with other access channels from other user-access concentrators 1926 in the set associated with the star coupler 1916X. As pre-arranged by the mutual space switch controller 1942X of the optical space switch that includes the star coupler 1916, none of the coincident time slots includes an optical signal that spectrally overlaps with a coincident optical signal. The output signal of the star coupler 1916X is then sent to the upstream wavelength router 1950. The upstream demultiplexer 1944 of the upstream wavelength router 1950 sends the signal during the given time slot to the upstream multiplexer 1946 connected to the selected baseband switch 1910, whereat the given time slot becomes part of a channel in multiplexed output signal sent to the selected baseband switch 1910. At the demultiplexer 1948 associated with the selected baseband switch 1910, the channel including the given time slot is demultiplexed and presented to the selected baseband switch 1910.

At the selected baseband switch 1910, the signal during the given time slot is converted from optical to electronic and the data in the given time slot is buffered. The controller 1958 of the selected baseband switch 1910 selects an output port and assigns a wavelength band for the signal during the given time slot. At the downstream demultiplexer 2044 associated with the selected baseband switch 1910, the signal is directed to the downstream multiplexer 2046 that is connected to the destination downstream optical space switch. The destination downstream optical space switch connects to the access concentrator 1926Y with access to the traffic destination (traffic sink). Additionally, the output port of the selected baseband switch 1910 associated with the downstream optical space switch is time-locked to the downstream optical space switch.

The outgoing signal that includes the given time slot is sent from the selected baseband switch 1910 to the downstream demultiplexer 2044 at the downstream wavelength router 2050. Once the signal has been demultiplexed by the downstream demultiplexer 2044, the outgoing signal that includes the given time slot is sent to the appropriate downstream multiplexer 2046 for multiplexing into a signal sent to the appropriate downstream optical space switch. The signal that arrives at the input demultiplexer 2052 at the appropriate downstream optical space switch is demultiplexed into component channels and each of the component channels is passed to a corresponding wavelength converter in the spectral-translation module 2054. Under control of the mutual space switch controller 1942 associated with the downstream optical space switch, the wavelength converter that receives the component channel that includes the given time slot acts to convert the wavelength of the component channel. The wavelength is converted to the wavelength associated with a selected output port of the output demultiplexer, where the selected wavelength is connected to the user-access concentrator 1926 with access to the traffic destination.

After wavelength conversion, the given time slot is received by the star coupler that is part of the combination 2016 in the downstream optical space switch. The star coupler passes a multiplexed output signal to the output demultiplexer, wherefrom the given time slot is passed to the user-access concentrator 1926 with access to the traffic destination. At the user-access concentrator 1926, the traffic in the received given time slot is buffered in an outgoing buffer 1139 (see FIG. 11) then passed to the traffic destination by the traffic interface 1132.

Channel Switching

In consideration of switching a particular flow of traffic that is not intended to be time-switched, for instance, an analog signal, or a continuous or near-continuous digital signal, or a signal in a format that is not supported by the baseband switch 1910, pre-arrangements are still required to be made. Such pre-arrangements are said to set up a channel-switched path. Initially, a given user-access concentrator 1926 receives an indication of a destination of the particular flow of traffic to be switched through the switching network of FIGS. 19 and 20. The given user-access concentrator 1926 sends a connection request to the mutual space switch controller 1942 of the optical space switch designated to support the set of user-access controllers of which the given user-access concentrator 1926 is a part. With the knowledge of the destination that the given user-access concentrator 1926 gained from the connection request, the mutual space switch controller 1942 of the optical space switch may consult a route set to select a preferred channel switch 1908 of the switching stage 1990-2 for switching the particular flow of traffic toward the destination user-access controller.

The mutual space switch controller 1942 of the upstream optical space switch may communicate a request for a channel path to the controller 1960 of the selected channel switch 1908. The request for a channel path specifies the wavelength incoming to the channel switch 1908 as the wavelength associated, at the upstream demultiplexer 1944 that is associated with the upstream optical space switch, with the upstream multiplexer 1946 that is connected to the selected channel switch 1908. Additionally, the request for a channel path specifies the wavelength outgoing from the channel switch 1908 as the wavelength associated, at the downstream demultiplexer 2044 that is associated with the selected channel switch 1908, with the downstream multiplexer 2046 that is connected to the downstream optical space switch whose concentrator set includes a user-access concentrator 1926 with access to the traffic destination.

The mutual space switch controller 1942 of the upstream optical space switch may also communicate a switching request to the mutual space switch controller 1942 of the downstream optical space switch whose concentrator set includes a user-access concentrator 1926 with access to the traffic destination. Such a switching request will indicate an incoming wavelength and the traffic destination.

Upon receiving an indication that the channel switch 1908 and the downstream optical space switch are appropriately configured, the mutual space switch controller 1942 of the upstream optical space switch may indicate to the concentrator controller 1140 (see FIG. 11) that transmission may begin on a particular wavelength. Unlike time switching, channel switching, in the form described herein, may require time-locking only for signaling purposes.

The transmission of a given continuous signal to be switched may begin at the user-access concentrator 1926 once the indication is received from the mutual space switch controller 1942 of the upstream optical space switch. The concentrator controller 1140 (see FIG. 11) directs the incoming buffer 1133 to present the continuous signal to the modulator 1135 and directs the tunable laser 1134 to set the carrier wavelength appropriately.

The access channel from the given user-access concentrator 1926, including the given continuous signal, is multiplexed by the star coupler 1916 with other access channels from other user-access concentrators 1926 in the set associated with the star coupler 1916, such other access channels consisting of timeslot-based traffic and/or continuous flow traffic. As pre-arranged by the mutual space switch controller 1942 of the optical space switch that includes the star coupler 1916, optical signals do not spectrally overlap at any time. The output signal of the star coupler 1916 is then sent to the upstream wavelength router 1950. The upstream demultiplexer 1944 of the upstream wavelength router 1950 sends the given optical carrier modulated by the given continuous signal to the upstream multiplexer 1946 connected to the selected channel switch 1908, whereat the modulated optical carrier becomes part of a multiplexed output signal sent to the selected channel switch 1908.

In contrast to the case of the baseband switch 1910, the continuous flow of traffic is not converted from optical to electronic or buffered. It is expected that the channel switch 1908 is appropriately configured to switch the continuous flow of traffic in the direction of the desired destination.

The outgoing signal that includes the continuous flow of traffic is sent from the selected channel switch 1908 to the downstream demultiplexer 2044 at the downstream wavelength router 2050. Once the signal has been demultiplexed by the downstream demultiplexer 2044, the continuous flow of traffic is sent to the appropriate downstream multiplexer 2046 for multiplexing into a signal sent to the appropriate downstream optical space switch. The signal that arrives at the input demultiplexer 2052 at the appropriate downstream optical space switch is demultiplexed into component channels and each of the component channels is passed to a corresponding wavelength converter in the spectral-translation module 2054. Under control of the mutual space switch controller 1942 associated with the downstream optical space switch, the wavelength converter that receives the component channel that includes the continuous flow of traffic acts to convert the wavelength of the component channel. The wavelength is converted to the wavelength associated with a selected output port of the output demultiplexer, where the selected wavelength is connected to the user-access concentrator 1926 with access to the traffic destination.

After wavelength conversion, the continuous flow of traffic is received by the star coupler that is part of the combination 2016 in the downstream optical space switch. The star coupler passes a multiplexed output signal to the output demultiplexer, wherefrom the continuous flow of traffic is passed to the user-access concentrator 1926 with access to the traffic destination. Data traffic is buffered at the user-access concentrator 1926. The data is then time-slotted and held in an outgoing buffer 1139 (FIG. 11) for delivery to respective traffic sinks.

In review, the network of FIG. 19 and FIG. 20 constitutes a distributed space-time-space switch or a combined distributed space-time-space and space-space-space switch. The input space stage comprises input space switches each of which includes tunable lasers, a star coupler and a demultiplexer. The output space stage comprises output space switches each of which constructed as a demultiplexer, a spectral-translation module, a star coupler, and a second demultiplexer. The time stage in a distributed space-time-space switch comprises baseband switches and the middle space stage in a distributed space-space-space switch comprises channel switches which may be optical based or electronics based. A spectral-translation module comprises a plurality of wavelength converters as described with reference to FIG. 18A.

A path from a user-access concentrator subtending to an input-stage space switch (upstream space switch) to another user-access concentrator subtending to an output-stage space switch is established through three steering at the input-stage space switch, a middle-stage baseband switch or a middle-stage channel switch, and the output-stage space switch. There is a one-to-one correspondence between a wavelength band at the output of an upstream star coupler and a middle-stage baseband or channel switch. Steering at the input-stage space switch (FIG. 17) is effected by selecting a wavelength band at the source user-access concentrator. Steering at the output-stage space switch (FIG. 18A) is effected by wavelength-band shifting at the spectral-shifting module. Steering at the middle-stage switch, whether it is a baseband switch or channel switch, is performed within the middle-stage switch according to its specific design.

Figure 21:
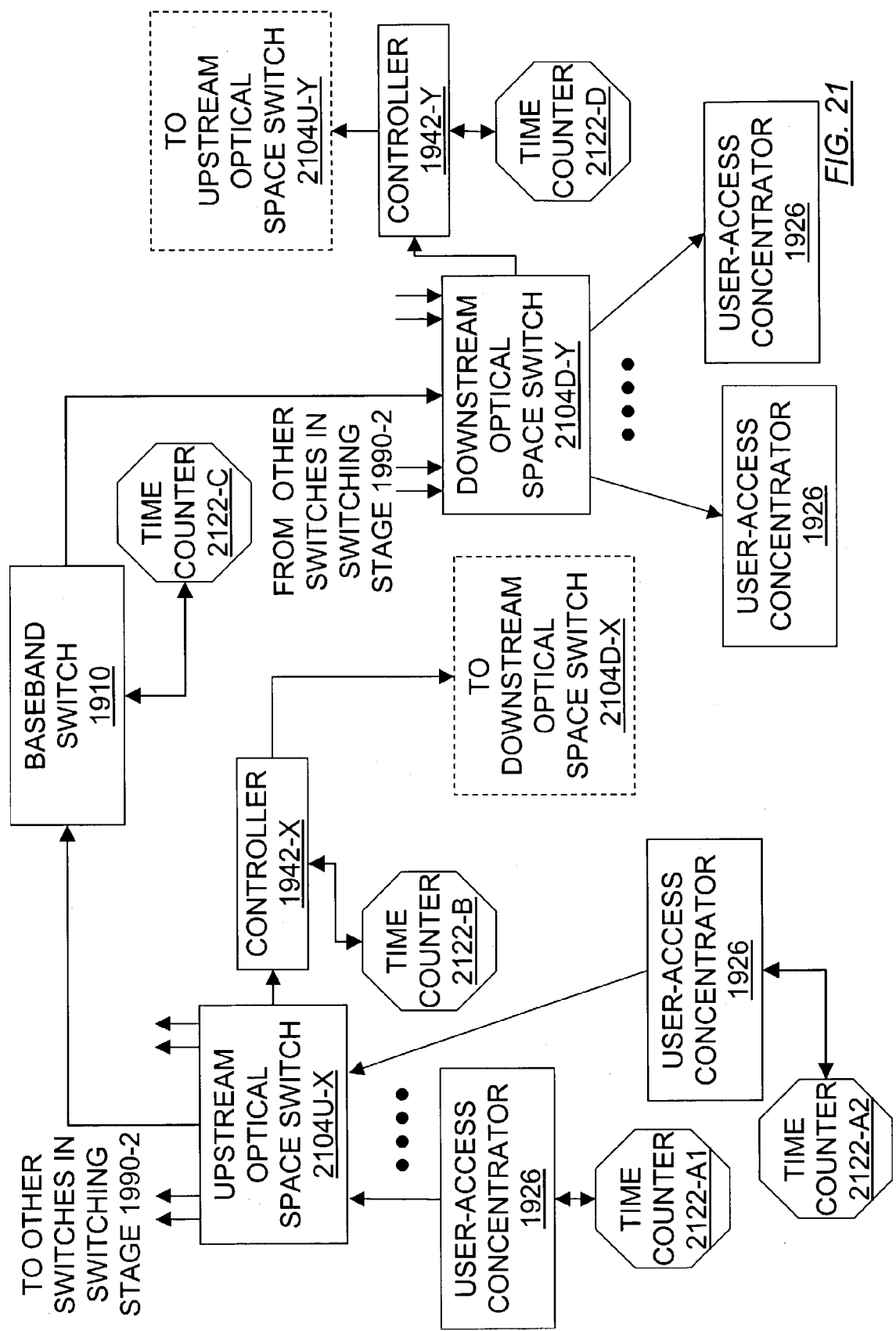
FIG. 21 illustrates time-locked upstream and downstream paths traversing a source access concentrator, an upstream space switch, a core electronic switch, a downstream space switch, and a destination. access concentrator.

FIG. 21 is introduced as a simplification of the switching network of FIGS. 19 and 20 especially concerned with the time-switched path described hereinbefore. Components familiar from the switching network of FIGS. 19 and 20 are reintroduced in conjunction with identification of supplementary components. In particular, a first upstream optical space switch 2104U-X and a first downstream optical space switch 2104D-X are associated with a first optical space switch controller 1942-X. Similarly, a second upstream optical space switch 2104U-Y and a second downstream optical space switch 2104D-Y are associated with a second optical space switch controller 1942-Y.

Connected to the optical space switches 2104 are user-access concentrators 1926 familiar from the switching network of FIGS. 19 and 20. Supplemental to the user-access concentrators 1926 connected to the first upstream optical space switch 2104U-X are concentrator time counters 2122-A1, 2122-A2. Although the concentrator time counters 2122-A1, 2122-A2 are shown as being external to the user-access concentrators 1926, they may also be internal, as illustrated in FIG. 11.

Additionally, the first optical space switch controller 1942-X is shown to communicate with a first controller time counter 2122-B and the second optical space switch controller 1942-Y is shown to communicate with a second controller time counter 2122-D. As illustrated in FIG. 13, the controller time counters 2122-B, 2122-D may also be internal to the controller.

Notably, the baseband switch 1910 is equipped with a switch time counter 2122-C.

In order to properly switch time slots received from a user-access concentrator 1926 at the first upstream optical space switch 2104U-X, the concentrator time counter 2122-A1 must be time-locked to the first controller time counter 2122-B. As described hereinbefore for a time-switched path, the user-access concentrator 1926 transmits each time frame to the first upstream optical space switch 2104U-X so that the start of a time frame arrives at the first upstream optical space switch 2104U-X at an instant of time specified by the first controller 1942-X. A time slot within that time frame is switched, at the first upstream optical space switch 2104U-X, toward a baseband switch 1910 by selecting a corresponding wavelength band. The path to the baseband switch 1910 includes passive components more fully understood through a review of FIG. 19.

The optical signal received by the baseband switch is converted to an electrical signal so that the data in these time slots may be extracted and buffered, before being sent to the second downstream optical space switch 2104D-Y. The data in these time slots is then placed in a time frame sent on an optical channel outgoing from the baseband switch 1910. The path from the baseband switch 1910 to the second downstream optical space switch 2104D-Y includes passive components more fully understood through a review of FIG. 20. In particular, the channel on which the time frame is carried outgoing from the baseband switch 1910 is multiplexed with other channels before arriving at the second downstream optical space switch 2104D-Y.

At the second downstream optical space switch 2104D-Y, the time slots are switched to their respective destination user-access concentrators 1926 for distribution to respective traffic destinations. The time switching at the second downstream optical space switch 2104D-Y requires that the switch counter 2122-C be time-locked to the second controller time counter 2122-D.

Figure 22:
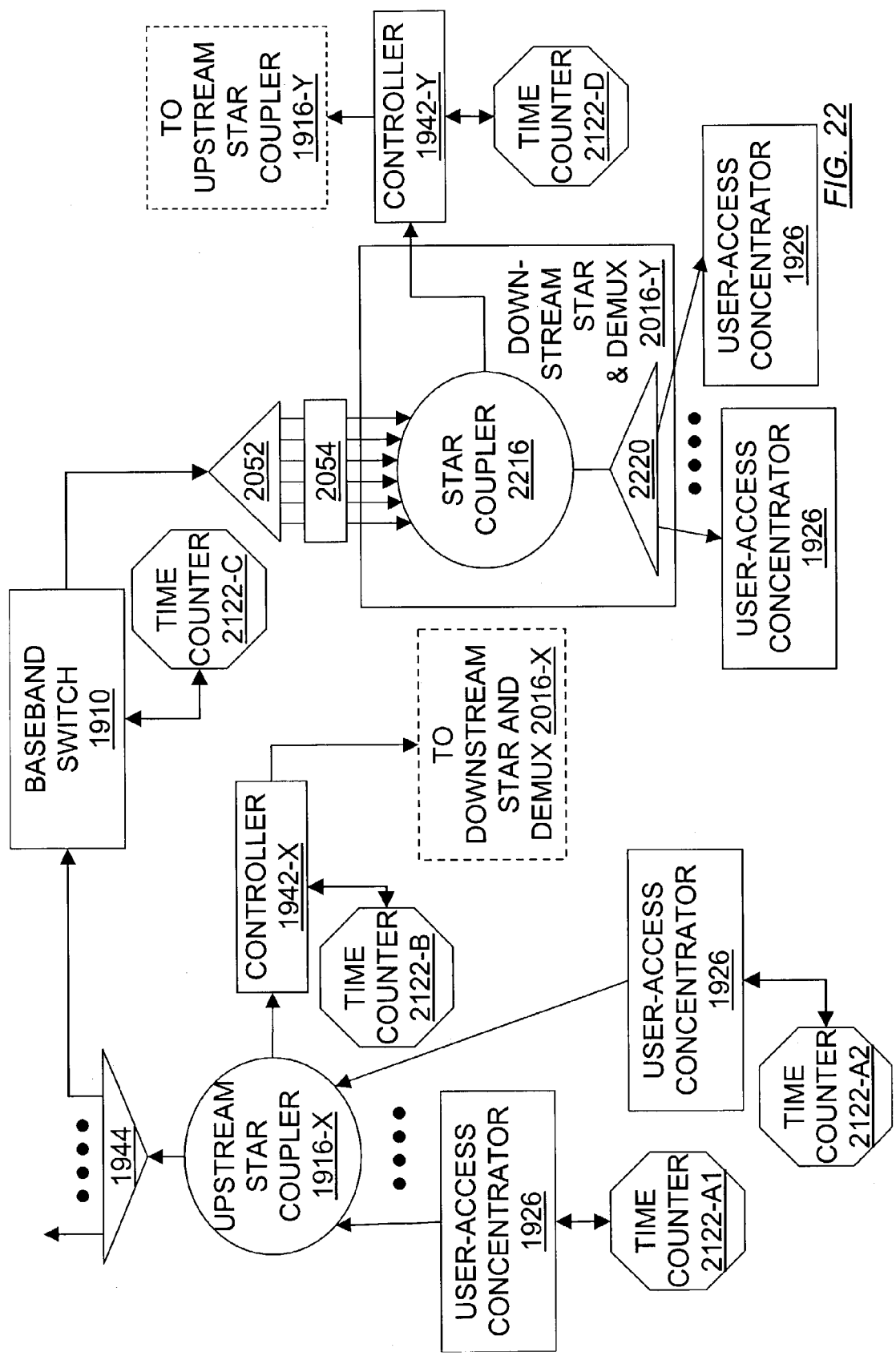
FIG. 22 illustrates the time-locked paths of FIG. 21 with each space switch implemented as a star-coupler-based space switch.

The relationship between FIG. 21 and the switching network of FIGS. 19 and 20 is made clearer in FIG. 22. In particular, the first upstream optical space switch 2104U-X of FIG. 21 is replaced, in FIG. 22, by an upstream star coupler 1916-X in combination with one of the upstream demultiplexers 1944 of the upstream wavelength router 1950. Additionally, the second downstream optical space switch 2104D-Y of FIG. 21 is replaced, in FIG. 22, by a downstream combination star coupler and demultiplexer 2016-Y along with an input demultiplexer 2052 and a spectral-translation module 2054. The components of the combination 2016-Y are shown to include a downstream star coupler 2216 and an output demultiplexer 2220.

It is to be noted that the architectures described hereinbefore may be modified to use electronic-based space switches instead of photonic-based space switches.

Advantageously, the architecture presented as embodiments of aspects of the present invention exploit the current state-of-the-art in optical and electronic devices. All components of the proposed network are currently realizable or envisaged to be shortly realizable.

Other modifications will be apparent to those skilled in the art and, therefore, the invention is defined in the claims.

What is claimed is:

1. A distributed space-time-space switch of comprising:
    an electronic time-switching stage including a plurality of electronic time switches;
    an input stage including a plurality of upstream optical space switches, where each upstream optical space switch of said plurality of upstream optical space switches receives upstream input signals on a plurality of input channels and transmits upstream output signals to at least one electronic time switch of said plurality of electronic time switches; and
    an output stage including a plurality of downstream optical space switches, where each downstream optical space switch of said plurality of downstream optical space switches receives downstream input signals from at least one electronic time switch of said plurality of electronic time switches and transmit downstream output signals on a plurality of output channels,
    wherein each of said optical space switches is associated with a controller for scheduling connections across said each of said optical space switches, and
    wherein each electronic time switch of the plurality of electronic time switches is operable to transmit an optical signal to a given downstream optical space switch in said output stage so that said optical signal arrives at said given downstream optical space switch at an instant of time specified by said controller associated with said, given downstream optical space switch.

2. The distributed space-time-space switch of claim 1 wherein at least one of said optical space switches comprises a star coupler and a demultiplexer.

3. The distributed space-time-space switch of claim 2 wherein said demultiplexer comprises an Arrayed Waveguide Grating device.

4. The distributed space-time-space switch of claim 2 wherein said demultiplexer comprises an Echelle grating device.

5. The distributed space-time-space switch of claim 2 wherein said demultiplexer comprises an array of thin-film filters.

6. The distributed space-time-space switch of claim 2 wherein said demultiplexer comprises an optical filter device incorporating a fiber Bragg grating.

7. The distributed space-time-space switch of claim 2 wherein said demultiplexer comprises an optical filter device incorporating a waveguide Bragg grating.

8. The distributed space-time-space switch of claim 2 wherein said star coupler includes a plurality of star-coupler input ports and at least one star-coupler output port.

9. The distributed space-time-space switch of claim 8 wherein at least one of said star-coupler input ports receives optical signals from a wavelength tunable source.

10. The distributed space-time-space switch of claim 9 wherein at least one of said star-coupler input ports receives optical signals from a wavelength converter.

11. The distributed space-time-space switch of claim 10 wherein at least one of said downstream optical space switches comprises a first demultiplexer, a spectral-translation module, a star coupler and a second demultiplexer, said spectral-translation module including a plurality of wavelength-converters.

12. The distributed space-time-space switch of claim 1 wherein said plurality of input channels are received on a single wavelength division multiplexed link.

13. The distributed space-time-space switch of claim 1 wherein said plurality of output channels are transmitted on a single wavelength division multiplexed link.

14. A switching network comprising:
    a plurality of electronic time switches;
    a wavelength router communicatively connected to each of said plurality of electronic time switches by a wavelength-division-multiplexed link, where said wavelength router routes received signals according to wavelength; and
    a plurality of optical space switches, wherein each optical space switch of said plurality of optical space switches is communicatively connected to said wavelength router by the wavelength-division-multiplexed link;

wherein each optical space switch of said plurality of optical space switches includes:
an upstream optical space switch which:
receives upstream signals from a plurality of user-access concentrators; and
switches said upstream signals toward said wavelength router; and
a downstream optical space switch which:
receives downstream signals from said wavelength router; and
switches said downstream signals toward said plurality of user-access concentrators.

15. The switching network of claim 14 wherein said wavelength router comprises an upstream wavelength router and a downstream wavelength router, wherein: said upstream wavelength router communicatively connects to each of said plurality of electronic time switches by a corresponding upstream wavelength-division-multiplexed link; and said downstream wavelength router communicatively connects to each of said plurality of electronic time switches by a corresponding downstream wavelength-division-multiplexed link.

16. A switching network comprising: a plurality of electronic time switches; a plurality of wavelength routers, each of said plurality of wavelength routers connecting to each of said plurality of electronic time switches by corresponding wavelength-division-multiplexed links; a plurality of optical space switches arranged in a plurality of groups, wherein each of said plurality of groups is associated with a given wavelength router of said plurality of wavelength routers and each optical space switch of the plurality of optical space switches in each group of said plurality of groups communicatively connects to said associated given wavelength router by a wavelength-division-multiplexed link; and a plurality of concentrators arranged in a plurality of concentrator sets, where each concentrator set in said plurality of concentrator sets is associated with a given optical space switch of said plurality of optical space switches.

17. The network of claim 16 wherein each concentrator of the plurality of concentrators in a given concentrator set of the plurality of concentrator sets:
receives incoming signals from a plurality of traffic sources;
processes said incoming signals to form outgoing optical signals; and
transmits said outgoing optical signals to said optical space switch associated with said given concentrator set.

18. The network of claim 17 wherein each concentrator of the plurality of concentrators in a given concentrator set of the plurality of concentrator sets:
receives control signals from a controller of an optical space switch of said plurality of optical space switches; and
selects wavelengths for optical carriers for said outgoing optical signals based on said control signals.

19. The network of claim 16 wherein said each concentrator of the plurality of concentrators:
receives a time-slotted downstream optical signal from said optical space switch associated with said given concentrator set;
processes said downstream optical signal to give individual signals; and
transmits said individual signals to a plurality of traffic sinks.

20. The network of claim 16 wherein each wavelength router of said plurality of wavelength routers comprises an upstream wavelength router and a downstream wavelength router, wherein: said upstream wavelength router communicatively connects to each of said electronic time switches of the plurality of electronic time switches by a corresponding upstream wavelength-division-multiplexed link; and said downstream wavelength router communicatively connects to each of said electronic time switches of the plurality of electronic time switches by a corresponding downstream wavelength-division-multiplexed link.

21. The network of claim 20 wherein said upstream wavelength router comprises a first array of multiplexers interlaced with a first array of demultiplexers and said downstream wavelength router comprises a second array of multiplexers interlaced with a second array of demultiplexers.

22. The network of claim 21 wherein each multiplexer in said first array of multiplexers and each demultiplexer in said first array of demultiplexers is an Arrayed Waveguide Grating device.

23. The network of claim 21 wherein each multiplexer in said second array of multiplexers and each demultiplexer in said second array of demultiplexers is an Arrayed Waveguide Grating device.

24. The network of claim 16 wherein each optical space switch of said plurality of optical space switches comprises an upstream optical space switch and a downstream optical space switch and wherein:
said upstream optical space switch:
receives upstream optical signals from one of said concentrator sets of the plurality of concentrator sets; and
selectively transmits said upstream optical signals to an upstream wavelength router in said associated given wavelength router; and
each downstream optical, space switch:
receives downstream optical signals from a downstream wavelength router in said associated given wavelength router; and
selectively transmits said downstream optical signals to an associated concentrator set of the plurality of concentrator sets.

25. The network of claim 24 wherein said upstream optical space switch and said downstream optical space switch are associated with a mutual space switch controller.

26. The network of claim 25 wherein each concentrator of the plurality of concentrators in a given concentrator set transmits an outgoing optical signal to said optical space switch associated with said given concentrator set so that said outgoing optical signal arrives at said optical space switch associated with said given concentrator set at an instant of time specified by said mutual space switch controller of said optical space switch associated with said given concentrator set.

27. The network of claim 26 wherein said each concentrator of the plurality of concentrators in said given concentrator set transmits said outgoing optical signal to said optical space switch associated with said given concentrator set so that said outgoing optical signal uses a wavelength channel specified by said mutual space switch controller of said optical space switch associated with said given concentrator set.

28. The network of claim 25 wherein each concentrator of the plurality of concentrators in a given concentrator set comprises a tunable laser for altering a wavelength of said outgoing optical signal to an upstream optical space switch associated with said given concentrator set to a wavelength specified by said mutual space switch controller of said optical space switch associated with said given concentrator set.

29. The network of claim 25 wherein each of said electronic time switches of the plurality of electronic time switches transmits an optical signal to said downstream optical space switch so that said optical signal arrives at said downstream optical space switch at an instant of time specified by said mutual space switch controller of said optical space switch associated with a given concentrator set.

30. The network of claim 29 wherein said upstream optical space switch comprises a star coupler and an Arrayed Waveguide Grating demultiplexer, said star coupler having a plurality of input ports and at least one output port, a one of said at least one output ports connecting to said Arrayed Waveguide Grating demultiplexer, said plurality of input ports receiving optical signals from an associated concentrator set.

31. The network of claim 29 wherein said upstream optical space switch comprises a star coupler having a plurality of input ports and at least one output port, each of said plurality of input ports receiving an optical signal from one of said plurality of concentrators via an associated wavelength converter.

32. The network of claim 31 wherein said associated wavelength converter is controlled by said mutual space switch controller.

33. The network of claim 29 wherein said downstream optical space switch comprises: a first wavelength demultiplexer, a spectral-translation module, a star coupler; and a second wavelength demultiplexer; where said star coupler has a plurality of star coupler input ports and a single star coupler output port connecting to said second wavelength demultiplexer; and where said second wavelength demultiplexer has a plurality of wavelength demultiplexer output ports and at least one of said wavelength demultiplexer output ports communicatively connects to one of said plurality of concentrators.

34. The network of claim 33 wherein selected ones of said star coupler input ports receive an optical signal from said spectral-translation module and said spectral-translation module is controlled by said mutual space switch controller of said optical space switch associated with said given concentrator set.

35. A switching node comprising:
an input array of optical space switches;
a middle array of switches including optical space switches and time-space switches;
an output array of optical space switches;
a plurality of first switch controllers for controlling said optical space switches in said input array and said output array;
a plurality of second switch controllers for controlling said optical space switches in said middle array of switches; and
a plurality of third switch controllers for controlling said time-space switches in said middle array of switches,
wherein:
each of said optical space switches in said input array has a link to each of said optical space switches in said middle array of switches;
each of said optical space switches in said input array has a link to each of said time-space switches in said middle array of switches;
each of said optical space switches in said middle array switches has a link to each of said optical space switches in said output array;
each of said time-space switches in said middle array of switches has a link to each of said optical space switches in said output array; and
each of said links comprises at least one channel.

36. The switching node of claim 35 wherein a path from one of said optical space switches in said input array to one of said optical space switches in said output array through one of said optical space switches in said middle array of switches is a continuous channel path.

37. The switching node of claim 36 wherein a given first switch controller of said plurality of first switch controllers communicates with a given second switch controller of said plurality of second switch controllers by shifting a carrier wavelength of a channel transmitted from an optical space switch associated with said given first switch controller to an optical space switch associated with said given second switch controller.

38. The switching node of claim 35 wherein a path from one of said optical space switches in said input array to one of said optical space switches in said output array through one of said time-space switches in said middle array of switches is a time-slotted path.

39. The switching node of claim 38 wherein a given first switch controller of said plurality of first switch controllers transmits control signals to a given third switch controller of said plurality of third switch controllers during a designated time slot in a time-slotted frame.

* * * * *